(12) United States Patent
Baba et al.

(10) Patent No.: US 6,911,963 B2
(45) Date of Patent: Jun. 28, 2005

(54) FIELD-SEQUENTIAL COLOR DISPLAY UNIT AND DISPLAY METHOD

(75) Inventors: Masahiro Baba, Yokohama (JP); Kazuki Taira, Tokyo-To (JP); Haruhiko Okumura, Fujisawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 353 days.

(21) Appl. No.: 10/017,581

(22) Filed: Dec. 18, 2001

(65) Prior Publication Data

US 2002/0122019 A1 Sep. 5, 2002

(30) Foreign Application Priority Data

Dec. 21, 2000 (JP) .................................. 2000-389085

(51) Int. Cl.[7] .............................................. G09G 3/36
(52) U.S. Cl. .......................... 345/88; 345/690; 348/742
(58) Field of Search ........................ 345/22, 88, 690, 345/589, 603; 348/441, 739, 742

(56) References Cited

U.S. PATENT DOCUMENTS

| | | | | |
|---|---|---|---|---|
| 5,428,408 A | * | 6/1995 | Stanton ...................... | 348/742 |
| 5,461,397 A | * | 10/1995 | Zhang et al. ............... | 345/102 |
| 6,034,666 A | * | 3/2000 | Kanai et al. ................ | 345/593 |
| 6,392,656 B1 | * | 5/2002 | Someya et al. ............. | 345/589 |
| 6,621,497 B1 | * | 9/2003 | Sugiura et al. ............. | 345/600 |

FOREIGN PATENT DOCUMENTS

| | | |
|---|---|---|
| EP | 000700215 A2 * | 3/1996 |
| JP | 8-101672 | 4/1996 |
| JP | 9-90916 | 4/1997 |

\* cited by examiner

Primary Examiner—Regina Liang
(74) Attorney, Agent, or Firm—Oblon, Spivak, McClelland, Maier & Neustadt, P.C.

(57) ABSTRACT

There is provided a field-sequential color displaying method capable of reducing color breakup with respect to an optional image without greatly increasing a sub-field frequency. The field-sequential color display method includes; time-sequentially displaying of luminous information of an input image information with every display color and changing the display color in synchronism with the displaying of the luminous information in order to display the input image information, wherein one frame period in which one color image is displayed includes at least four sub-field periods in which information of each color is displayed, and a picture signal displayed in at least one sub-field period is a non-three-primary color picture signal which is generated from at least two primary color signals of input picture signals including three-primary color signals.

4 Claims, 22 Drawing Sheets

| LIQUID CRYSTAL COLOR SHUTTER 34 | LIQUID CRYSTAL COLOR SHUTTER 36 | LIQUID CRYSTAL COLOR SHUTTER 38 | COLOR OF TRANSMITTED LIGHT |
|---|---|---|---|
| ON | ON | OFF | W (RGB) |
| OFF | ON | ON | R |
| OFF | OFF | ON | G |
| ON | OFF | OFF | B |
| OFF | ON | OFF | C (GB) |
| OFF | OFF | OFF | M (RB) |
| ON | OFF | ON | Y (RG) |

| DISPLAY COLOR | COLOR POLARIZER (C) | | COLOR POLARIZER (M) | | COLOR POLARIZER (Y) |
|---|---|---|---|---|---|
| RED (R) | TRANSMISSION | | M (B+R) | | Y (G+R) |
| GREEN (G) | C (B+G) | | TRANSMISSION | | Y (G+R) |
| BLUE (B) | C (B+G) | × | M (B+R) | × | TRANSMISSION |
| CYAN (C) | C (B+G) | | TRANSMISSION | | TRANSMISSION |
| MAGENTA (M) | TRANSMISSION | | M (B+R) | | TRANSMISSION |
| YELLOW (Y) | TRANSMISSION | | TRANSMISSION | | Y (G+R) |
| ACHROMATIC COLOR (W) | TRANSMISSION | | TRANSMISSION | | TRANSMISSION |
| BLACK (K) | C (B+G) | | M (B+R) | | Y (G+R) |

FIG. 23

FIELD-SEQUENTIAL COLOR DISPLAY UNIT AND DISPLAY METHOD

CROSS REFERENCE TO RELATED APPLICATION

This application is based upon and claims the benefit of priority from the prior Japanese Patent Applications No. 2000-389085, filed on Dec. 21, 2000; the entire contents of which are incorporated herein by reference.

BACKGROUND OF THE INVENTION

1. Field of the Invention

The present invention generally relates to a field-sequential color display unit and display method.

2. Description of Related Art

Conventionally, typical color displays are designed to carry out a color display on the basis of spatially additive color mixing system. In general, the spatially additive color mixing system is a method for arranging three-primary colors, i.e., red (which will be hereinafter referred to as R), green (which will be hereinafter referred to as G) and blue (which will be hereinafter referred to as B), in parallel so that the observer can not recognize such a state that R, G and B are spatially divided, and the primary colors are varied the ratio of each intensity and mixed in the observer's eyes in order to display color images. In contrast to this method, in recent years, displays based on the field-sequentially additive color mixing system are being actively developed. In the case of the spatially additive color mixing system, it is required to divide one pixel into three sub-pixels corresponding to red, green and blue (RGB) pixel in order to carry out color displaying. On the other hand, in the case of the field-sequentially additive color mixing system, color displaying can be carried out with one pixel. Therefore, the field-sequentially additive color mixing system is widely noticed as one of the methods for increasing there solution of displays. In contrast to the spatially additive color mixing system, the field-sequentially additive color mixing system is designed to temporally divide with every input picture into the three-primary color's displaying periods, and display the divided periods sequentially at such a speed that the observer can not recognize the divided periods, to carry out color displaying. A display unit utilized the field-sequentially additive color mixing system is generally called a field-sequential color display unit.

There are field-sequential color display units having various systems, such as a color shutter system or a backlight system illuminating the three-primary colors. In all systems, the field-sequential color display unit is designed to divide a set of signals of each input picture into R, G and B signals, which are signals indicative of the three-primary colors, in order to sequentially display R, G and B images during one frame period at the triple speed to carry out color displaying. That is, in the field-sequential color display unit, one frame period, which is a time required to complete the update each color image displaying, comprises a plurality of fields which display each color information. Each of the field periods will be hereinafter referred to as a sub-field in order to distinguish it from a field period in an interlacing display. When the interlacing display is carried out using the field-sequential color display unit, one field generally comprises three sub-fields of the primary colors R, G and B, and one frame comprises even-odd two fields. In order to simplify discussion, if there is no particular explanation, it is hereinafter assumed that the non-interlacing display is a premise, which means one frame equals to one field, and one frame comprises a plurality of sub-field.

In a typical display unit, one frame frequency must be displayed at the critical fusion frequency (CFF) or at a higher frequency so as a flicker cannot be recognized. Therefore, in the field-sequential color display unit, each sub-field must be displayed at the frequency of N times as many as a frame frequency wherein the number of sub-fields per frame is N. For example, as shown in FIG. 25, assuming that one frame frequency is 60 Hz, a field-sequential color display requires three sub-fields for RGB per frame; each sub-field frequency is 180 Hz.

In order to realize the field-sequential color display, there is used means for temporally filtering a monochrome image by an RGB filter or means for temporally switching illumination of a plurality of RGB light sources. Specifically, as examples of the former, there are constructions wherein a white light source illuminates a light valve and an RGB disk color filter (color wheel) is mechanically rotated and wherein monochrome (black and white) images are displayed on a monochrome CRT (Cathode Ray Tube) and a liquid crystal color shutter is provided in front of the CRT. As an example of the latter, there is provided a construction wherein a light valve is illuminated with RGB-colorized illumination by LEDs (Light Emitting Diodes) or a set of cold cathode fluorescent lamps.

From the aforementioned reasons, the field-sequential color display requires a higher refresh rate than the display based on the spatially additive color mixing system. Therefore, it is desirable that the light valve for displaying images uses a display device having fully rapid response time, such as a DMD (Digital Micro-mirror Device), a bend alignment liquid crystal cell (including a PI twisted cell, and OCB (Optically Compensated Birefringence) mode in which a phase compensating film is added), a FLC (Ferroelectric Liquid Crystal) cell using liquid crystal materials in the smectic phase including SSFLC (Surface Stabilized Ferroelectric Liquid Crystal) cell, an AFLC (Antiferroelectric Liquid Crystal) cell including a V-shaped response liquid crystal cell (which is frequently called TLAF (ThresholdLess Anti-Ferroelectric) mode wherein a voltage-transmittance curve indicates a thresholdless V-shaped response). Generally, most of the liquid cell modes used for the liquid crystal color shutter is able to use for the display device.

Therefore, in the field-sequential color display, the lower limit of the sub-field frequency at which a flicker cannot be perceived is 3 times of the CFF, i.e., about 150 Hz. It is known that the "color breakup artifact" occurs if the sub-field frequency is lower than the limit. This is interference that the profile of an image or screen is seen so as to be colorized since the RGB-images are time-integrated without being coincident with each other on a retina due to the eye movement following a moving picture, blink or saccade of an eye.

For example, if the frame frequency 60 Hz, each of RGB-sub-fields is displayed at 180 Hz. If the observer watches a static image, the RGB-colors of the sub-field images are mixed on the observer's retinas at 180 Hz, so that a true color image can be presented to the observer. When a white box 210 is displayed on the screen as shown in FIG. 26(a), the colors of the sub-field images of red, green and blue are mixed on the observer's retinas and presented a true color image to the observer. However, when the observer's eyes move across the display screen toward the direction of arrow 300 in FIG. 26(a), e.g., the R sub-field image 212 of the box image is presented to the observer's retinas in a certain moment, and the G sub-field image 214 of the box image is presented to the observer's retinas in the next moment and the B sub-field image 216 of the box image is presented to the observer's retinas in the next moment. Therefore, the three images of R, G and B are not synthesized so as to be completely coincident with each other on the observer's retinas, and the three images are synthesized with shifted from each other, since the observer's eye move across the display screen. As a result, the sub-field images of R, G and B are synthesized so as not to be coincident with the position of each edge of the box image. Therefore, the color breakup artifact such that the sub-field images of R, G and B are seen with separated colors is recognized. Such a phenomenon gives viewing stress or fatigue to the observer when the display unit is watched for a long time.

It is known that it is effective to increase the sub-field frequency in order to reduce the color breakup artifact. However, there is a limit of increasing the sub-field frequency due to the response time of a liquid crystal display or the like, and it is difficult to provide such a circuit, so that this is not preferred means.

On the other hand, there is proposed a method that an achromatic color signal (W signal) sub-field is added to the RGB sub-fields with a quadruple sub-field frequency (see Japanese Patent Laid-Open No. 8-101672). In this method, the minimum value of the RGB signals in each pixel per frame is displayed in a W sub-field, and chromatic color components which is differences between the value in the W sub-field and the original RGB signals are displayed in the RGB sub-fields. According to this method, most of signal components are displayed in the W sub-field in the case of an achromatic color components having high luminance, i.e., in the case of displaying a bright and whitish image, so that it is theoretically difficult to recognize color breakup. However, the aforementioned method can hardly obtain this effect in the case of displaying an image which comprises chromatic color components, e.g., in the case of displaying an image comprises many R and B signals and hardly contains G signals. For example, if the yellow (which will be hereinafter referred to as Y) components are dominant in an input picture signal, the color breakup between R and G is easily recognizable.

SUMMARY OF THE INVENTION

It is therefore an object of the present invention to eliminate the aforementioned problems and to provide a field-sequential color display unit and display method capable of reducing the color breakup of an optional image without greatly increasing a sub-field frequency.

In order to accomplish the aforementioned object, according to one aspect of the present invention, there is provided a field-sequential color display method comprising time-sequentially displaying of luminous information of an input image information with every display color and changing the display color in synchronism with the displaying of the luminous information to display the input image information, wherein one frame period in which one color image is displayed comprises at least four sub-field periods in which information of each color is displayed, and a picture signal displayed in at least one sub-field period is a non-three-primary color picture signal which is generated from at least two primary color signals of input picture signals including the three-primary color signals.

This picture signal (which will be hereinafter referred to as a non-three-primary color signal) generated from the plurality of the three-primary color signals and displayed in the sub-field period is determined on the basis of the input image information.

The display colors of the primary color signals may include red, green and blue, and the display color of the non-three-primary color picture signal may be any one of white, cyan, magenta and yellow which are generated from the at least two primary color signals.

The non-three-primary color signal displayed in the sub-field period may be determined on the basis of a part of the input image information in one frame period.

The non-three-primary color signal displayed in the sub-field period may be determined on the basis of the input image information of every predetermined frame interval including a plurality of frame periods.

The non-three-primary color picture signal displayed in the sub-field period may be determined at every scene change of the input image information.

The picture signal displayed in the sub-field period may be one of the modified picture signals, which are obtained by separating the input picture signal into the n sets of the non-three-primary color picture signals and three sets of the modified three-primary color picture signals when n is an integer of 1 or more.

The picture signal displayed in the sub-field period may comprise the separated and modified three-primary color picture signals, and the n sets of the non-three-primary color picture signals which are generated from the at least two primary color signals. And in the sets of the non-three-primary color signals, it is preferable that an average of the intensity per pixel included of the non-three-primary color signal is higher than at least one of the averages calculated from the modified three-primary color picture signals.

The separation of the picture signals may be carried out by detecting the minimum value from the three-primary colors signals, causing the minimum value to be set as the signal value of a first non-three-primary color signal, and causing a smaller signal value of two modified picture signals, which are generated by subtracting the minimum value from the three-primary color signal values and which are not zero, to be set as a second non-three-primary color signal.

The field-sequential color display method may include converting the input picture signal into chromaticity coordinates in the process that the input picture signal is separated into the n sets of the non-three-primary color picture signals and the modified three-primary color signals.

According to another aspect of the present invention, a field-sequential color display unit comprises: a non-three-primary color signal generator which generates a non-three-primary color signal(s) by selecting at least two primary color signals from three-primary color signals on the basis of an input picture signal including the three-primary color signals; a monochrome image display which sequentially displays an input picture signal as a monochrome image; a color display which is capable of changing a display color every sub-field period, at least four of which comprise one frame period, in synchronism with the monochrome image; and a display color controller which controls the color display so as to display the non-three-primary color signal in at least one of the sub-field periods.

The colors of the three-primary color signals are red, green and blue, and the color of the non-three-primary color picture signal is any one selected from all or several sets of white, cyan, magenta and yellow which are generated colors from at least two primary color selected from the three-primary colors.

The non-three-primary color signal generator may include a signal separating circuit separating the three-primary color signals from the input picture signal, and generate the non-three-primary color signal from the three-primary color signals separated by the signal separating circuit.

The monochrome image display may be a self-emissive monochrome image display unit, and the color display may be a color filter which is provided in front of the monochrome image display unit and which is capable of time-sequentially changing color.

The color filter may be a liquid crystal color shutter comprising liquid crystal cells for controlling the polarization state of incident light, and a plurality of polarizers.

The field-sequential color display unit may be a projection type-display unit having an optical lens field-sequential to project a field-sequential color image as an enlarged or reduced image on a screen.

The color display may be a color wheel.

The field-sequential color display unit may be a HMD (Head Mounted Display) for observing a field-sequential color displayed image via an enlarging optical system which is arranged in front of an observer's visual field.

The monochrome image display may be a liquid crystal light valve of transmissive or reflective type, and the color display may be a backlight (frontlight) provided on the back or front side of the liquid crystal light valve, the backlight (frontlight) having a plurality of light sources capable of emitting light with time-sequentially selecting or combining color from the three-primary colors in order to illuminate the liquid crystal light valve.

BRIEF DESCRIPTION OF THE DRAWINGS

The present invention will be understood more fully from the detailed following description and from the attached drawings of the embodiments of the invention. However, the drawings are not intended to imply limitation of the invention to a specific embodiment, but are for explanation and understanding only.

In the drawings:

FIG. 23 is a table showing the relationship between display colors and transmitted colors of polarizers of a liquid crystal color shutter in the eighth embodiment;

DESCRIPTION OF THE EMBODIMENTS

Referring now to the accompanying drawings, the embodiments of the present invention will be described below in detail.

(First Embodiment)

Figure 1:
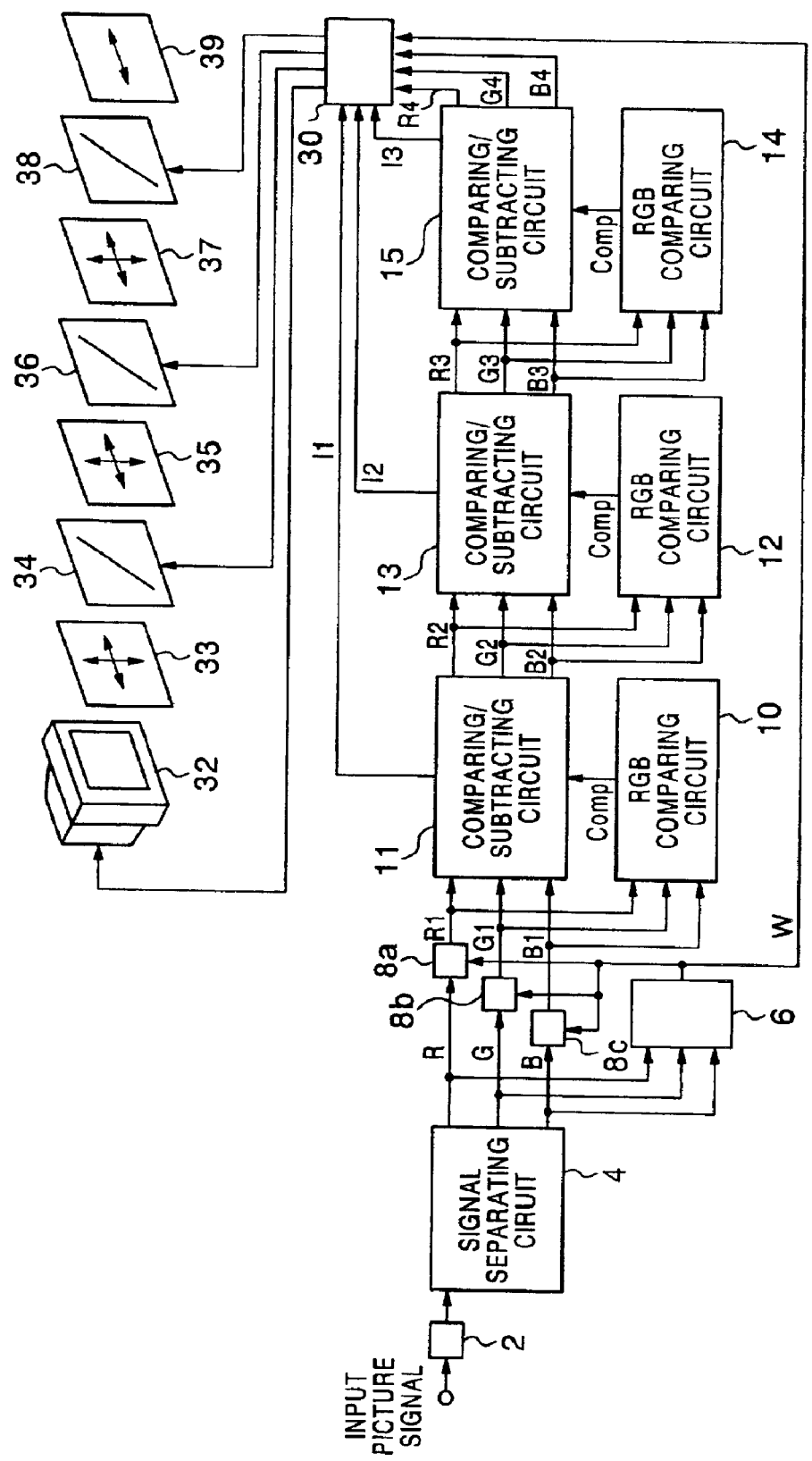
FIG. 1 is a block diagram of a field-sequential color display unit according to the first embodiment of the present invention.

FIG. 1 shows the construction of a field-sequential color display unit according to the first embodiment of the present invention. The field-sequential color display unit in this embodiment comprises an inverse gamma correction circuit 2, a signal separating circuit 4, an RGB minimum-value detecting circuit 6, subtracting circuits 8*a*, 8*b*, 8*c*, RGB comparing circuits 10, 12, 14, comparing/subtracting circuits 11, 13, 15, a liquid crystal color shutter driving circuit 30 (which will be also hereinafter referred to as an LCCS driving circuit 30), a monochrome CRT 32, chromatic polarizers 33, 35, 37, liquid crystal shutters 34, 36, 38, and an achromatic polarizer 39.

The construction and operation of the field-sequential color display unit in this embodiment will be described below.

After an input picture signal is inversely gamma-corrected by the inverse gamma correction circuit 2, it is separated into three-primary color picture signals, i.e., an R signal, a G signal and a B signal, by the signal separating circuit 4. The separated three-primary color picture signals are inputted to the RGB minimum-value detecting circuit 6 and the subtracting circuits 8a, 8b and 8c. The RGB minimum-value detecting circuit 6 detects the minimum value of the R, G and B signals with every pixel in the input picture. The detected minimum value is inputted into the LCCS driving circuit 30 and the subtracting circuits 8a, 8b and 8c as an achromatic color signal (which will be hereinafter referred to as W signal).

The subtracting circuits 8a, 8b and 8c subtract the inputted w signal from the R, G and B signals to output an R1 signal (=R signal−W signal), a G1 signal (=G signal−W signal) and a B1 signal (=B signal−W signal), respectively. Since the W signal is the minimum value of the R, G and B signals, any one of the R1, G1 and B1 signals is 0. The R1, G1 and B1 signals are inputted to the comparing/subtracting circuit 11 and the RGB comparing circuit 10.

The RGB comparing circuit 10 compares the intensities of three kinds of signals, i.e., the R1, G1 and B1 signals, with every pixel in the input picture for one frame, and counts combinations wherein the intensities of two kinds of signals of the aforementioned three kinds of signals are not 0. For example, if R1=30, G1=50 and B1=0, a combination of (R1, G1) is counted. If the intensities of two kinds or more of signals of a pixel are 0, the pixel is ignored and is not to be counted. The aforementioned process is carried out with respect to one frame of the input picture signal to output a combination having the highest frequency (the greatest counted value) as a Comp signal. That is, the Comp signal is a signal indicative of any one of combinations (R, G), (R, B) and (G, B). The outputted Comp signal, together with the R1, G1 and B1 signals, is inputted to the comparing/subtracting circuit 11.

The comparing/subtracting circuit 11 detects the minimum value I1 from two kinds of signals, which are not 0, of the R1, G1 and B1 signals of a pixel corresponding to the combination indicated by the Comp signal, and subtracts the minimum value I1 from the aforementioned two kinds of signals, which are not 0. At this time, subtraction is not carried out with respect to the signals of pixels corresponding to combinations other than the combination indicated by the Comp signal. For example, in the case of a pixel corresponding to the combination indicated by the Comp signal is (R, G), the value of the B1 signal is 0, and the smaller value of the R1 and G1 signals is I1, so that an R1 signal (=R1 signal−I1), a G2 signal (=G1 signal−I1) and a B2 signal (=B1 signal) are calculated to be outputted from the comparing/subtracting circuit 11.

Then, the minimum value is inputted to the LCCS driving circuit 30 as an I1 signal. In addition, the R2, G2 and B2 signals being the outputs of the comparing/subtracting circuits 11 are inputted to the comparing/subtracting circuit 13 and the RGB comparing circuit 12 again. Furthermore, since the I1 signal is indicative of any one of combinations (R, G), (R, B) and (G, B), it is any one of a yellow (which will be hereinafter referred to as Y) signal, a magenta (which will be hereinafter referred to as M) signal and a cyan (which will be hereinafter referred to as C) signal.

With respect to the R2, G2 and B2 signals, the same process as the aforementioned process is carried out in the RGB comparing circuit 12 and the comparing/subtracting circuit 13. Then, the minimum value is inputted to the LCCS driving circuit 30 as an I2 signal, and R3, G3 and B3 signals being the outputs of the comparing/subtracting circuit 13 are inputted to the comparing/subtracting circuit 15 and the RGB comparing circuit 14. Furthermore, the I2 signal is a signal indicative of any one of combinations of two kinds of signals other than the combination of the I1 signal.

With respect to the R3, G3 and B3 signals, the same process as the aforementioned process is carried out in the RGB comparing circuit 14 and the comparing/subtracting circuit 15. Then, R4, G4 and B4 being the outputs of the comparing/subtracting circuit 15 and the minimum value I3 signal are inputted to the LCCS driving circuit 30. Furthermore, the I3 signal is a signal indicative of a combination other than the combinations of the I1 and I2 signals.

After the aforementioned process, signals obtained by separating the input picture signal into seven kinds of W, Y, M, C, R4, G4 and B4 signals are inputted to the LCCS driving circuit 30.

A system for separating an input picture signal in this embodiment will be described below in more detail.

Figure 2:
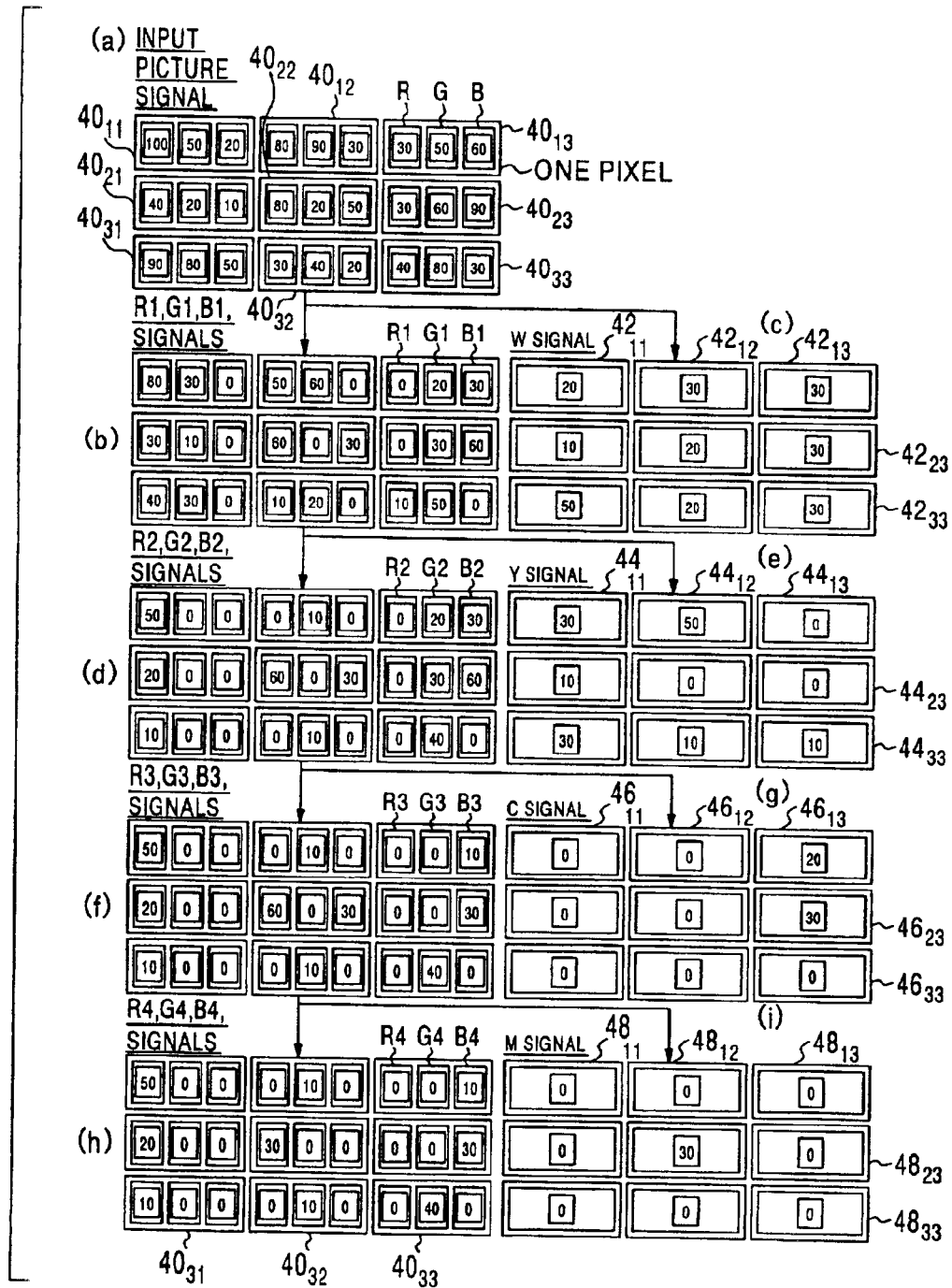
FIG. 2 is an illustration for explaining a method for separating an input picture signal in the first embodiment.

FIG. 2 schematically shows a system for separating an input picture signal in this embodiment. In order to simplify explanation, FIG. 2 shows a case where picture signals of 3×3 pixels $40_{ij}$ (i, j=1, 2, 3) are inputted and where one pixel comprises three kinds of sub-pixels of R, G and B from the left. The numeric characters added to R, G and B indicate the intensities of the respective sub-pixel signals assuming that the maximum is 100. First, the inputted picture signal is separated into R1, G1 and B1 signals by means of the RGB minimum-value detecting circuit 6 and the subtracting circuits 8a, 8b and 8c. For example, in the case of the upper-left pixel $40_{11}$, shown in FIG. 2(a), R=100, G=50 and B=20, so that W=20. Therefore, R1, G1 and B1 are R1=R−W=80, G1=G−W=30, and B1=B−W=0, respectively. The values of the R1, G1 and B1 signals corresponding to each pixel $40_{ij}$ (i, j=1, 2, 3) thus obtained are shown in FIG. 2(b), and the values $42_{ij}$ of the W signal corresponding thereto thus obtained are shown in FIG. 2(c).

Then, the R1, G1 and B1 signals are inputted to the RGB comparing circuit 10 to derive a combination wherein the frequency of combinations of two kinds of signals of the R1, G1 and B1 signals of one frame is maximum. In the case of FIG. 2(b), the frequency of the combination (R, G) is 6, the frequency of the combination (R, B) is 1, and the frequency of the combination (G, B) is 2. Therefore, the RGB comparing circuit 10 determines that the frequency of combination (R, G) is highest, and transmits the results to the comparing/subtracting circuit 11.

On the basis of the results outputted from the RGB comparing circuit 10, the comparing/subtracting circuit 11 derives a smaller value, i.e., the minimum value, of the values of the R1 and G1 signals corresponding to the combination (R, G), of the inputted R1, G1 and B1 signals, with every pixel. In the case of the upper-left pixel $40_{11}$, shown in FIG. 2(b), R1=80, G1=30 and B1=0, so that the minimum value of this pixel, i.e., a Y(R, G) signal, Y=30. Therefore, R2, G2 and B2 signals are R2=R1−Y=50, G2=G1−Y=0, and B2=B1=0, respectively. The B1 signal is not to be subtracted, since the combination is (R, G). The values of the R2, G2 and B2 signals corresponding to each pixel $40_{ij}$ (i, j=1, 2, 3) thus obtained are shown in FIG. 2(d), and the values $44_{ij}$ of the Y signal corresponding thereto thus obtained are shown in FIG. 2(e).

With respect to the R2, G2 and B3 outputted from the comparing/subtracting circuit 11, the same process as the aforementioned process is carried out by the RGB comparing circuit 12 again. In the case of FIG. 2(d), the frequency of the combination (R, G) is 0, the frequency of the combination (R, B) is 1, the frequency of the combination (G, B) is 2, and the frequency of uncounted combinations (combinations wherein the values of two kinds or more of signals of the R, G and B signals are 0) is 6. Therefore, the RGB comparing circuit 12 determines that the frequency of combination (G, B) is highest, and transmits the results to the comparing/subtracting circuit 13. On the basis of this result, the comparing/subtracting circuit 13 derives the minimum value with respect to the combination (G, B) wherein the frequency of combination is highest, from the R2, G2 and B2 signals, and subtraction is carried out. That is, in the case of the upper-right pixel $40_{13}$ shown in FIG. 2(d), the minimum value, i.e., a C (G, B) signal is C=20, and R3, G3 and B3 signals are R3=R2=0, G3=G2−C=0, and B3=B2−C=10, respectively. The values of the R3, G3 and B3 signals corresponding to each pixel $40_{ij}$ (i, j=1, 2, 3) thus obtained are shown in FIG. 2(f), and the values $46_{ij}$ of the C signal corresponding thereto thus obtained are shown in FIG. 2(g).

Moreover, with respect to the R3, G3 and B3 signals, the same process as the aforementioned process is also carried out in the RGB comparing circuit 14 and the comparing/subtracting circuit 15. In the case of FIG. 2(f), the frequency of the combination (R, B) is 1, and the frequency of uncounted combinations is 8. Therefore, it is determined that the frequency of combination (R, B) is highest. However, this process may be omitted since it can be determined from the results of two RGB comparing processes before this process that the combination has not been combined. On the basis of this result, with respect to the R3, G3 and B3 signals, the comparing/subtracting circuit 15 derives the minimum value with respect to the combination (R, B) wherein the frequency of combination is highest, and subtraction is carried out. That is, in the case of the central pixel $40_{22}$ shown in FIG. 2(f), the minimum value, i.e., an M(R, B) signal is M=30, and R4, G4 and B4 signals are R4=R3−M=30, G4=G3=0, and B4=B3−M=0, respectively. From the aforementioned process, the input picture signal is separated into picture signals of W, Y, C, M, R4, G4 and B4. That is, by the inverse gamma correction circuit 2, the signal separating circuit 4, the RGB minimum-value detecting circuit 6, the subtracting circuits 8a, 8b, 8c, the RGB comparing circuits 10, 12, 14, and the comparing/subtracting circuits 11, 13, 15, the three-primary color picture signals of R, G and B are separated, and non-three-primary color picture signals of W, Y, C and M are generated.

The seven kinds of picture signals separated by the aforementioned process are inputted to the LCCS driving circuit 30. The LCCS driving circuit 30 records the separated picture signals in a frame memory (not shown), and sequentially outputs them at a frequency seven times as many as the frame frequency of the input picture signal. This output image signal is inputted to the monochrome CRT 32, and sequentially displayed the picture signals of the W, Y, C, M, R4, G4 and B4 signals. In synchronism with this display, the three liquid crystal shutters 34, 36 and 38 are driven by the LCCS driving circuit 30, so that it is possible to present a color image to the observer.

Figures 3, 4:
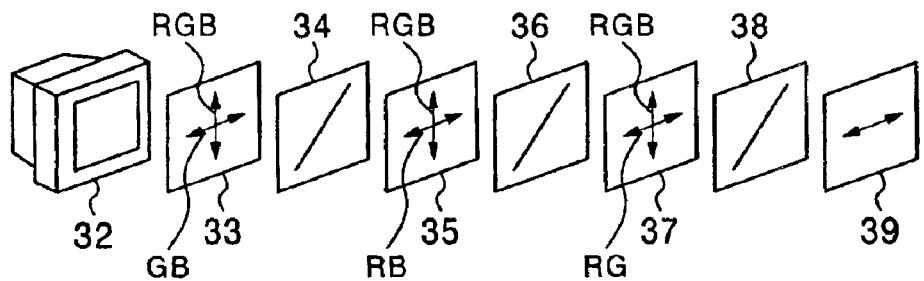
FIG. 3 is an illustration showing the construction of a liquid crystal color shutter in the first embodiment.
FIG. 4 is a table for explaining the relationship between the driving of the liquid crystal color shutter and the color of transmitted light in the first embodiment.

FIG. 3 shows the construction of chromatic polarizers and liquid crystal shutters in this embodiment. Chromatic polarizers 33, 35, 37, an achromatic color polarizer 39, and liquid crystal shutters 34, 36, 38 are arranged in series in a direction perpendicular to the display surface of the monochrome CRT 32. The arrows of the chromatic polarizer 33, 35, 37 and an achromatic color polarizer 39 denote the azimuths of transmission axes, and suffixes R, G, B denote the color of transmitted light. For example, in the chromatic polarizer 33, one of two polarizing axes transmits RGB, and the other polarizing axis transmits GB, i.e., C.

Each of the liquid crystal shutters 34, 36 and 38 preferably comprises a liquid crystal cell having high response characteristics, such as a ferroelectric liquid crystal cell or a bend alignment cell. In this embodiment, a bend alignment cell is used. The bend alignment cell is designed to maintain the azimuth of polarized incident light while it is turned ON, and to rotate the azimuth of polarized incident light by 90 degrees while it is turned OFF. That is, in the case of the aforementioned combination of the chromatic polarizers 33, 35, 37 and the liquid crystal shutters 34, 36, 38, if the ON/OFF of the three liquid crystal shutters 34, 36, 38 are combined as shown in FIG. 4, it is possible to display seven colors of W, C, M, Y, R, G and B. For example, if the liquid crystal shutters 34 and 36 are turned ON and if the liquid crystal shutter 38 is turned OFF, W, i.e., RGB, is the color of transmitted light, and if the liquid crystal shutter 34 is turned OFF and if the liquid crystal shutters 36 and 38 are turned ON, R is the color of transmitted light.

If seven kinds of picture signals are displayed on the monochrome CRT 32 at the septuple speed in synchronism with the drive of the three liquid crystal shutters 34, 36 and 38, it is possible to present a color image to the observer.

By such drive, the input image is outputted at a higher intensity as an image of non-three-primary color picture signals C, M and Y, the color differences therebetween being smaller than the color differences between the three-primary color picture signals R, G and B, so that a color which can not be displayed by the color mixture of C, M and Y is displayed by R, G and B. The R, G and B are the three-primary colors, and the color differences therebetween being greatest in colors capable of being reproduced by a display unit. If the color difference is great, the difference of colors is greatly perceived by the observer, so that color breakup increases.

As described above, the field-sequential color display unit in this embodiment is designed to display an image by C, M and Y which are non-three-primary color picture signals, the color difference therebetween being smaller than the color difference between the three-primary color picture signals R, G and B, and the intensities of the three-primary color picture signals R, G and B decrease, so that it is difficult for the observer to perceive color breakup.

(Second Embodiment)

Figure 5:
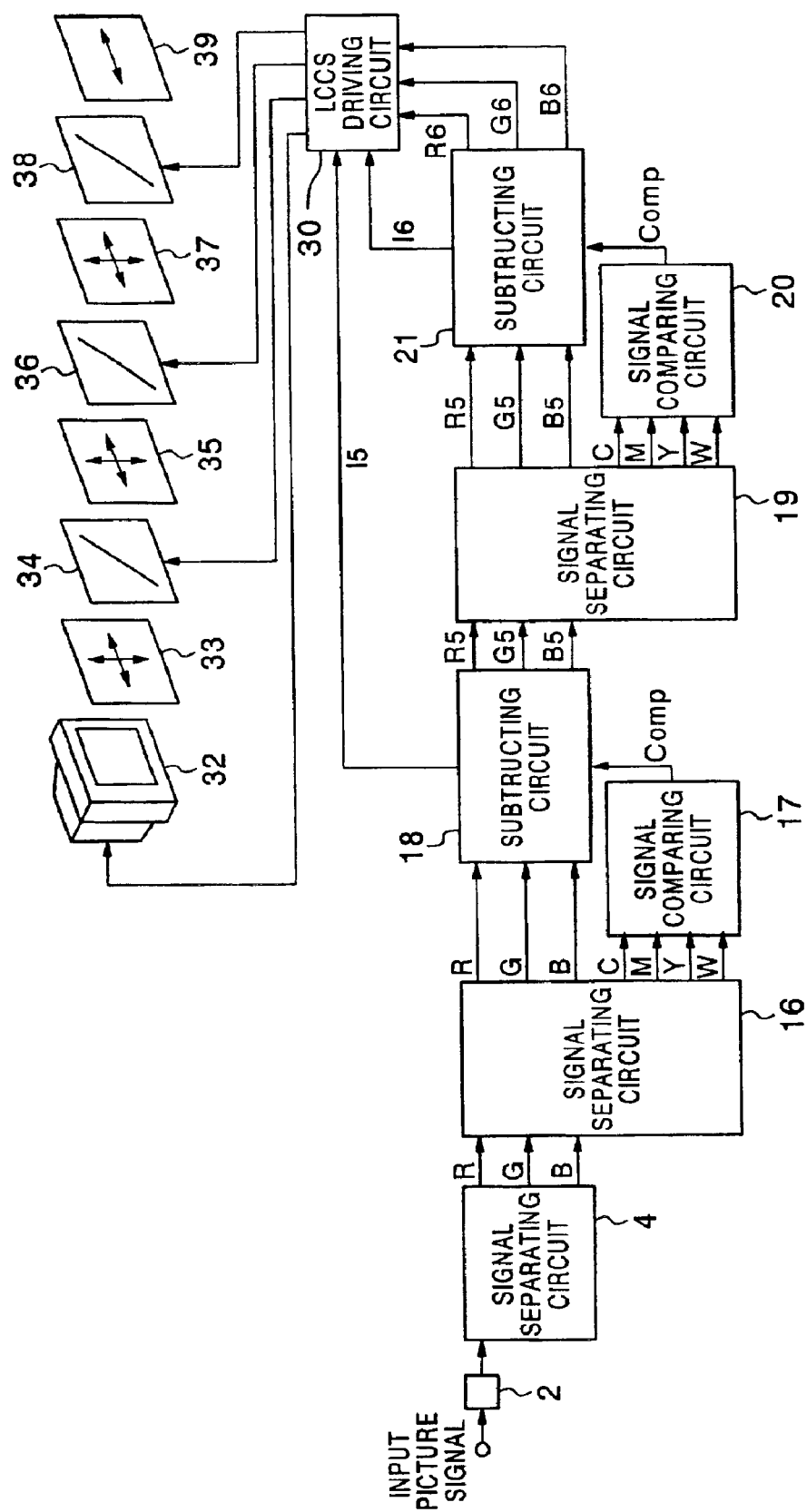
FIG. 5 is a block diagram of a field-sequential color display unit according to the second embodiment of the present invention.

FIG. 5 shows the construction of a field-sequential color display unit according to the second embodiment of the present invention. The field-sequential color display unit in this embodiment uses three-primary color signals of R, G and B signals and n non-three-primary color signals for carrying out a field-sequential color display. The field-sequential color display unit comprises an inverse gamma correction circuit 2, a signal separating circuit 4, signal separating circuits 16, 19, signal comparing circuits 17, 20, subtracting circuits 18, 21, an LCCS driving circuit 30, a monochrome CRT 32, chromatic polarizers 33, 35, 37, liquid crystal shutters 34, 36, 38, and an achromatic chromatic polarizing plate 39. In this embodiment, n is 2.

The construction and operation of the field-sequential color display unit in this embodiment will be described below.

After an input picture signal is inputted to the inverse gamma correction circuit 2 to be inversely gamma-corrected, it is separated into three-primary color signals of R, G and B signals by the signal separating circuit 4. The three-primary color signals are inputted to the signal separating circuit 16 to prepare a W signal by the minimum value of the R, G and B signals, a Y signal by the minimum value of the R and G signals, an M signal by the minimum value of the R and B signals, and a c signal by the minimum value of the G and B signals, with every pixel. These non-three-primary color W, Y, M and C signals are inputted to the signal comparing circuit 17.

The signal comparing circuit 17 compares the intensities of the combination of the R, G and B signals (W signal), R and G signals (Y signal), R and B signals (M signal) and G and B signals (C signal) with every pixel for one frame, and detects signals having the maximum signal intensity and then transmits a signal indicative of their combination to the subtracting circuit 18 as a Comp signal. In addition, the signal separating circuit 16 transmits the R, G and B signals, which are the outputs of the signal separating circuit 4, to the subtracting circuit 18 as they are. The Comp signal is a signal indicative of a combination (R, G, B) when the signal intensity of the w signal is maximum, a combination (R, G) when the signal intensity of the Y signal is maximum, a combination (R, B) when the signal intensity of the M signal is maximum, and a combination (G, B) when the signal intensity of the C signal is maximum.

The subtracting circuit 18 detects the minimum value from two or three kinds of signals of the R, G and B signals, which correspond to combinations of inputted by the Comp signal, as an I5 signal, and subtract the I5 signal from each of the aforementioned two or three kinds of signals. At this time, subtraction is not carried out with respect to signals which are not to be combined. For example, when the Comp signal is a signal indicative of the combination (G, B), the minimum value I5, i. e., the smaller value, of the values of the G and B signals, is detected, and the I5 signal is subtracted from each of the G and B signals. Then, the subtracted results are outputted to the signal separating circuit 19 as a G5 signal (=G signal–I5 signal) and a B5 signal (=B signal–I5 signal). At this time, since the R signal is a signal which is not to be combined, the subtraction of the R signal is not carried out, so that the R signal is outputted to the signal separating circuit 19 as an R5 signal (=R signal). In addition, the I5 signal is transmitted from the subtracting circuit 18 to the LCCS driving circuit 30.

By carrying out the same process as the aforementioned process in the signal separating circuit 19, the signal comparing circuit 20 and the subtracting circuit 21, the R5, G5 and B5 signals are separated into R6, G6, B6 and I6 signals to be inputted to the LCCS driving circuit 30.

In this embodiment, n=2, so that the number of the processes carried out by the subtracting circuit is two. In general, the number of processes carried out by the subtracting circuit is n in accordance with the value of n. From the aforementioned process, the input picture signal is separated into five kinds of picture signals of the R6, G6 and B6 signals which are the three-primary color signals, and the I5 and I6 signals which are non-three-primary color signals. The LCCS driving circuit 30 records the separated picture signals in a frame memory (not shown), and sequentially outputs them at a frequency (3+n) times as many as the frame frequency of the input picture signal. This output image is inputted to the monochrome CRT 32, and sequentially displayed the picture signals of the R6, G6, B6, I5 and I6 signals. Similar to the first embodiment, in synchronism with this display, the three liquid crystal shutters 34, 36 and 38 are driven, so that it is possible to present a color image to the observer.

By such drive, the input image is outputted at a higher intensity as an image of non three-primary color picture signals I5 and I6, the color difference therebetween being smaller than the color difference between the three-primary color picture signals R, G and B, so that a color which can not be displayed by the color mixture of I5 and I6 is displayed by R, G and B.

As described above, the field-sequential color display unit in this embodiment is designed to display an image by I5 and I6 which are non three-primary color picture signals, the color difference therebetween being smaller than the color difference between the three-primary color picture signals R, G and B, and the intensities of the three-primary color picture signals R, G and B decrease, so that it is difficult for the observer to perceive color breakup.

In this embodiment, the non three-primary color signals to be separated with every one frame of the input picture signal are determined. However, if the display colors of non-three-primary colors to be separated are changed in the middle of a series of moving picture, there is some possibility of giving discomfort, such as flicker, to the observer. In such a case, for example, the non-three-primary colors to be separated by the aforementioned system may be changed with every one of a plurality of continuous frames.

If the input picture signal is a picture signal for MPEG 2 (Moving Picture Experts Group 2), there is a method for changing non-three-primary colors, which are to be separated, with every intra coding frame (one frame), or the like.

Figure 29:
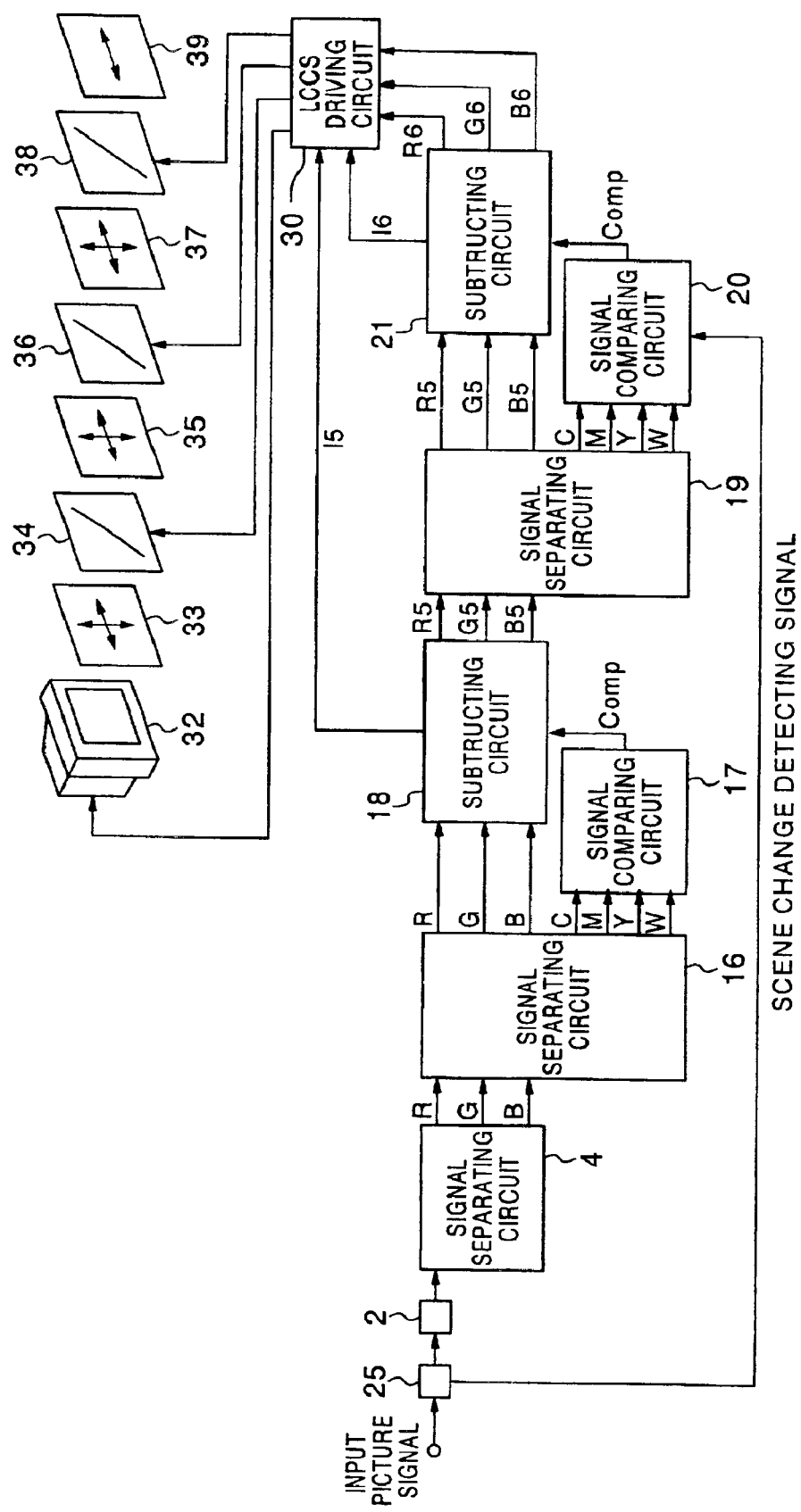
FIG. 29 is a block diagram of a field-sequential color display unit according to a variation of the second embodiment.

As another method, there is a method for detecting a scene change of an inputted moving picture by means of a scene change detecting circuit 25 shown in FIG. 29 and for changing non-three-primary colors, which are separated by the aforementioned process, only when a scene change is detected. FIG. 29 shows the construction of a field-sequential color display unit according to a variation of the second embodiment. The field-sequential color display unit in this variation is configured to add a scene change detecting circuit 25 to the second embodiment shown in FIG. 5. In this variation, an input picture signal is inputted to the scene change detecting circuit 25 to detect a scene change and output a scene-change-detecting signal to the signal comparing circuit 20. The signal comparing circuit 20, on the basis of the scene-change-detecting signal, carries out the same process as the second embodiment only when a scene change is detected, but does not change the Comp signal when the scene change is not detected. That is, only when the input picture signal shows the scene change, a non-three-primary color to be displayed is changed.

A plurality of methods is considered as scene change detecting methods. For example, a correlation between images of two temporally adjacent frames may be examined, and a case where the correlation is low may be detected as a scene change.

(Third Embodiment)

Figure 6:
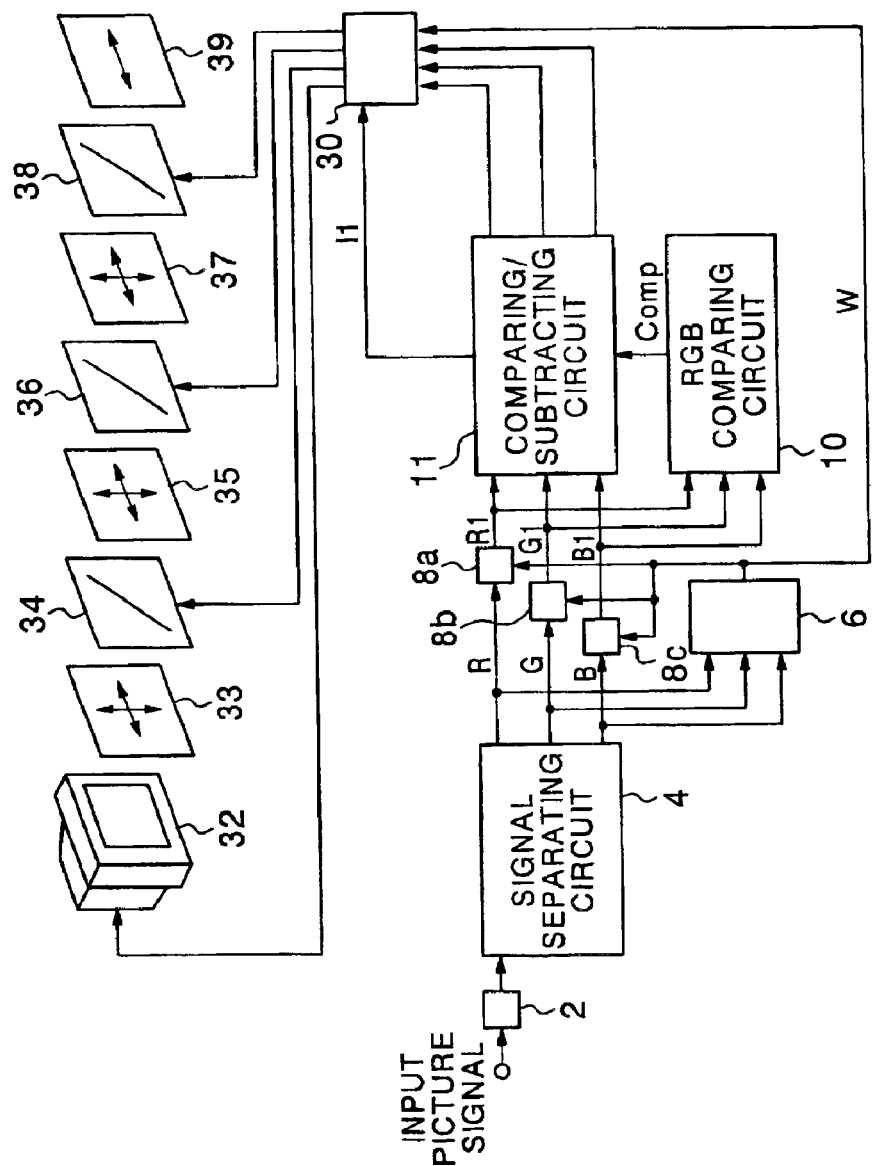
FIG. 6 is a block diagram of a field-sequential color display unit according to the third embodiment of the present invention.

Referring to FIG. 6, a field-sequential color display unit according to the third embodiment of the present invention will be described below.

The field-sequential color display unit in this embodiment uses R, G, B and W signals and a non-three-primary color signal for carrying out a field-sequential color display, and the construction thereof is shown in FIG. 6. The field-sequential color display unit in this embodiment comprises an inverse gamma correction circuit 2, a signal separating circuit 4, an RGB minimum-value detecting circuit 6, subtracting circuits 8a, 8b, 8c, RGB comparing circuits 10, 12, 14, comparing/subtracting circuits 11, 13, 15, a liquid crystal color shutter driving circuit 30 (which will be also hereinafter referred to as an LCCS driving circuit 30), a monochrome CRT 32, chromatic polarizers 33, 35, 37, liquid crystal shutters 34, 36, 38, and an achromatic polarizer 39. That is, the RGB comparing circuits 12, 14 and the comparing/subtracting circuits 13, 15 in the field-sequential color display unit in the first embodiment shown in FIG. 1 are omitted from the field-sequential color display unit in this embodiment. In the first embodiment, in order to separate the input picture signal into the C, M and Y signals, the subtracting process is carried out three times after the W signal is subtracted from the R, G and B signals. On the other hand, in this embodiment, the number of the subtracting processes is changed from three to two, so that the input picture signal can be separated into picture signals of R, G, B and W signals and a non-three-primary color signal.

The LCCS driving circuit 30, to which the separated picture signals have been inputted, records the separated picture signals in a frame memory (not shown), and sequentially outputs them at a frequency five (=4+1) times as many as the frame frequency of the input picture signal. This output image is inputted to the monochrome CRT 32 and sequentially displayed the separated picture signals. Similar to the first embodiment, in synchronism with this display, the three liquid crystal shutters 34, 36 and 38 are driven, so that it is possible to present a color image to the observer.

As described above, the field-sequential color display unit in this embodiment uses the R, G and B signals, which are three-primary color signals, and the I1 signal which is a non-three-primary color signal having a smaller color difference than the color difference between these three-primary color picture signals, for driving the liquid color shutters. Therefore, the intensities of the three-primary color signals R, G and B relatively decrease, so that it is difficult for the observer to perceive color breakup.

(Fourth Embodiment)

Figure 7:
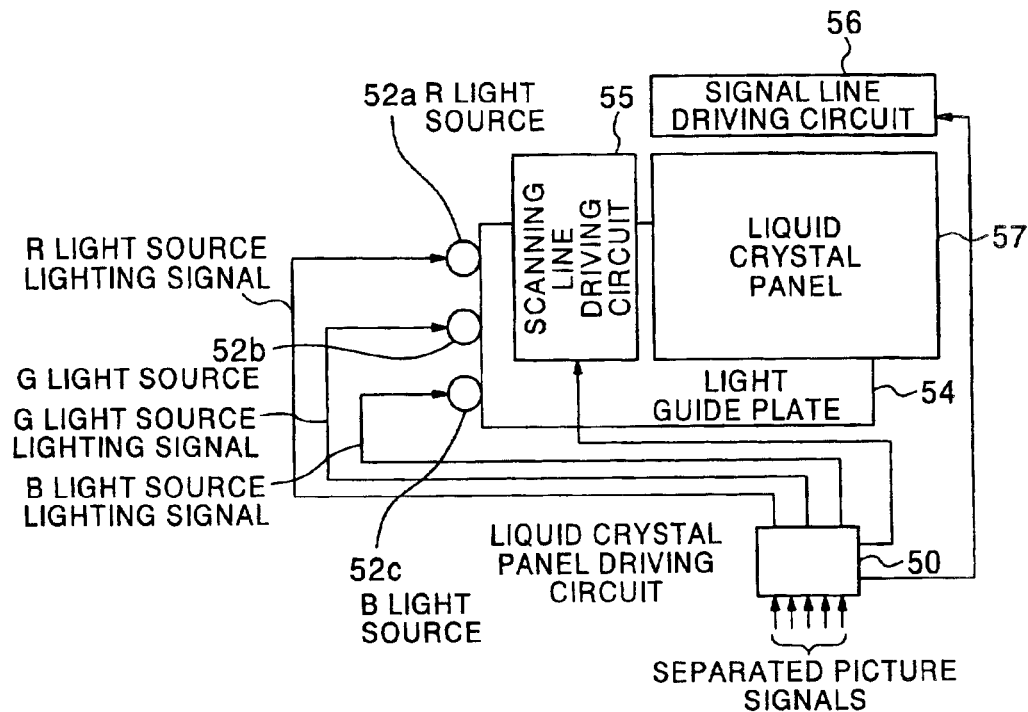
FIG. 7 is a block diagram of a field-sequential color display unit according to the fourth embodiment of the present invention.

Referring to FIG. 7, a field-sequential color display unit according to the fourth embodiment of the present invention will be described below. In the aforementioned first through third embodiments, the liquid crystal color shutters have been used as a color displaying part. The field-sequential color display unit in this embodiment comprises as a color displaying part, a backlight unit having the three-primary color light sources and a light guide plate, and a liquid crystal panel part for modulating the intensity of outgoing light from the light guide plate.

The portion for separating an input picture signal into three-primary color signals and non-three-primary color signals of C, M, Y and W signals is same as that in any one of the first through third embodiments.

FIG. 7 is a block diagram showing the schematic construction of the field-sequential color display unit in this embodiment. The field-sequential color display unit in this embodiment comprises: a liquid crystal panel driving circuit 50; a backlight unit including three-primary color light sources 52a, 52b, 52c and a light guide plate 54; and a liquid crystal panel part including a scanning line driving circuit 55, a signal line driving circuit 56 and a liquid crystal panel 57. Furthermore, the portions from the input picture signal to the liquid crystal panel driving circuit 50 are the same as those in any one of the first through third embodiment, so that these portions are omitted from FIG. 7. FIG. 7 shows a case where an input picture signal is separated into R, G and B signals and two kinds of picture signals (I5 and I6 signals in the second embodiment) by the process described in the second embodiment to be inputted to the liquid crystal panel driving circuit 50.

The three-primary color light sources 52a, 52b, 52c are turned on in response to the separated picture signals by the liquid crystal panel driving circuit 50. That is, when the R picture signal is outputted from the liquid crystal panel driving circuit 50, the R light source 52a is turned on, and when the I5 signal is the Y signal, the R light source 52a and the G light source 52b are turned on. Light sources, such as cold cathode fluorescent lamp or LEDs, may be used as the three-primary color light sources. Light sources capable of rapidly responding are preferably used. In this embodiment, LEDs are used.

Figure 8:
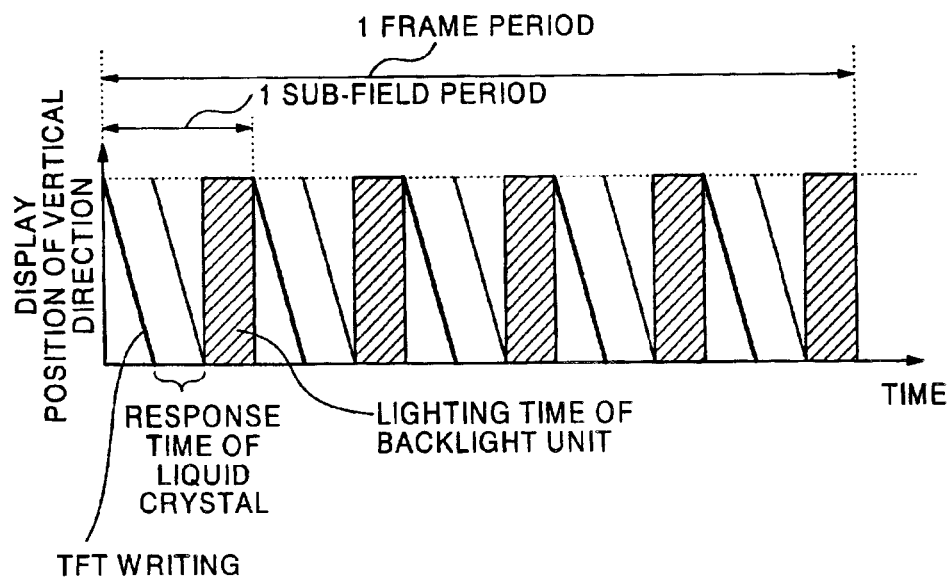
FIG. 8 is an illustration showing drive in the fourth embodiment.

FIG. 8 shows separated picture signals and the timing in turning the backlight unit on. In FIG. 8, the axis of ordinates denotes display position in the vertical direction on the liquid crystal panel, and the axis of abscissas denotes time. The separated picture signals are high-frequency-converted by the liquid crystal panel driving circuit 50 to be inputted to the signal line driving circuit 56. The picture signals inputted from the top of the LCD panel are written on the liquid crystal panel 57 by the line sequential writing. After the picture signals are written to the bottom end of the LCD panel, after a blanking period corresponding to the response time of the liquid crystal, a light source corresponding to the color of the written picture signal is turned on. As can be clearly seen from FIG. 8, the response time of the liquid crystal is preferably shorter in order to increase the lighting time of the backlight unit. In this embodiment, a ferroelectric liquid crystal panel is used as the liquid crystal panel although it is considered that an OCB panel or a narrow-gap TN type panel is used.

Subsequently, if the separated picture signals are sequentially field-sequential displayed on the liquid crystal panel 57 in the similar manner, a color image having the same effects as those in the second embodiment can be presented to the observer.

(Fifth Embodiment)

Figure 9:
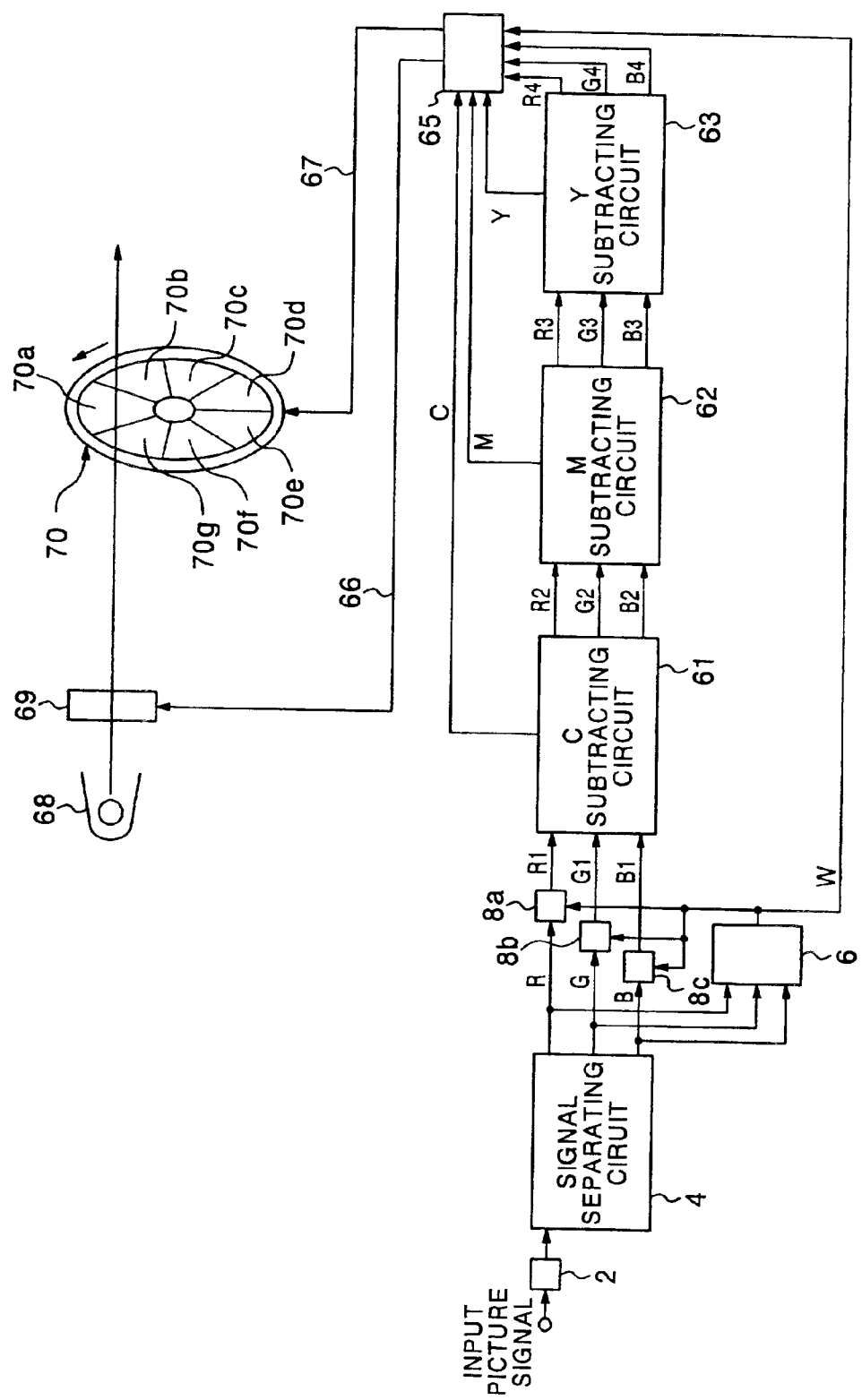
FIG. 9 is a block diagram of a field-sequential color display unit according to the fifth embodiment of the present invention.

Referring to FIG. 9, a field-sequential color display unit according to the fifth embodiment of the present invention will be described below.

The field-sequential color display unit in this embodiment is a projection type field-sequential color display unit using a color wheel, and the construction thereof is shown in FIG. 9. The field-sequential color display unit in this embodiment comprises an inverse gamma correction circuit 2, a signal separating circuit 4, an RGB minimum-value detecting circuit 6, subtracting circuits 8a, 8b, 8c, subtracting circuits 61, 62, 63, a color wheel driving circuit 65, a monochrome image (a black and white image) producing part including a light source 68 and a monochrome liquid crystal panel 69, and a color wheel 70.

In the case of the color wheel 70, the sequence of sub-fields depends on the order of color separation of the color wheel 70, so that the sequence of sub-fields is fixed. For that reason, separating an input picture signal into three-primary color signals and C, M, Y and W signals which are the non-three-primary color signal is substantially the same as that in the first embodiment. However, in the first embodiment, the color separation into C, M and Y is carried out on the basis of the input picture signal, whereas, in this embodiment, the W signal is first separated, and then, the C signal is separated, and subsequently, the M, Y, R, G and B signals are sequentially separated. However, the separating order should not be limited to this order, but the color separation may be carried out in another order. The separated input picture signals are inputted to the color wheel driving circuit 65. The color wheel comprises seven divided regions 70a, 70b, 70c, 70d, 70e, 70f and 70g. The divided regions are provided with filters for allowing the color of transmitted light to be R, G, B, W, C, M and Y, respectively. The color wheel 70 is designed to rotate in a direction of arrow in FIG. 9 at, e.g., 60 revolutions per second. In synchronism with the revolutions, the separated picture signals are inputted to the monochrome image producing part. The monochrome image producing part comprises, e.g., the light source 68, and the monochrome liquid crystal panel 69 which is provided on the optical axis of the light source 68 as a light valve. Furthermore, the monochrome liquid crystal panel 69 may be a transmission or reflection type panel, or another reflection type display device capable of changing the optical path with every pixel. When the R transmission filter 70a of the color wheel 70 overlaps with the optical path, the separated R picture signal is displayed on the monochrome image displaying part, and the same drive is carried out with respect to the other colors of G, B, W, C, M and Y, so that a color image having the same effects as those in the first embodiment can be presented to the observer.

In this embodiment, the color wheel is divided into seven parts. However, for example, if the input picture signal is divided into five kinds of signals of R, G, B, C and M and if the color wheel is divided into five parts, the same effects can be obtained.

As described above, according to the present invention, for the same reason which is described first through forth embodiments, it is possible to provide a field-sequential color display which is difficult for the observer to perceive color breakup.

(With Respect to Basic Construction in Sixth through Eighth Embodiments)

Before describing a field-sequential color display unit according to the sixth through eighth embodiments of the present invention, referring to FIGS. 10 and 11, the basic construction common to these embodiments will be described below.

Figure 10:
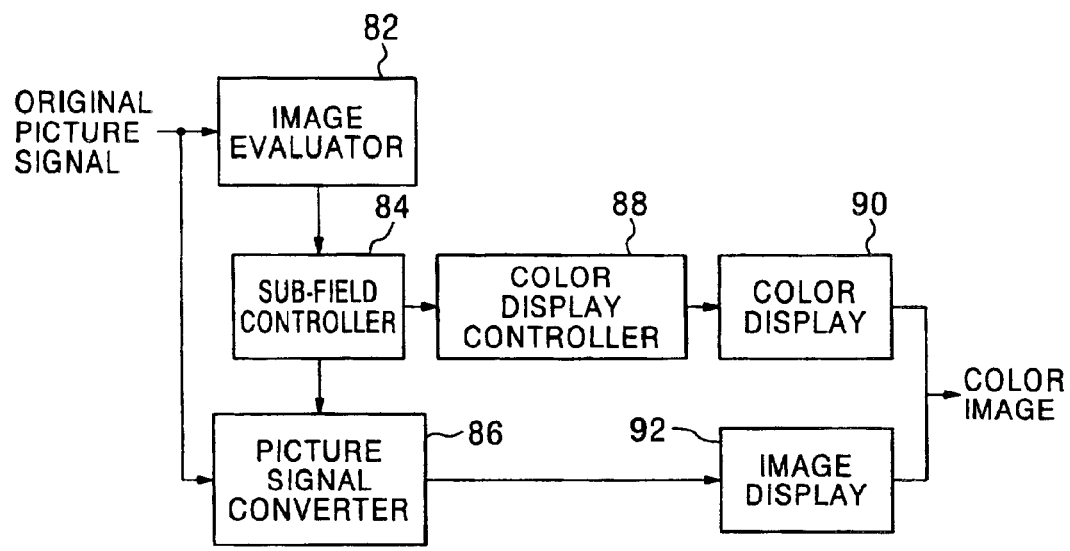
FIG. 10 is a block diagram showing a field-sequential color display unit according to the sixth through eighth embodiments of the present invention.
Figure 11:
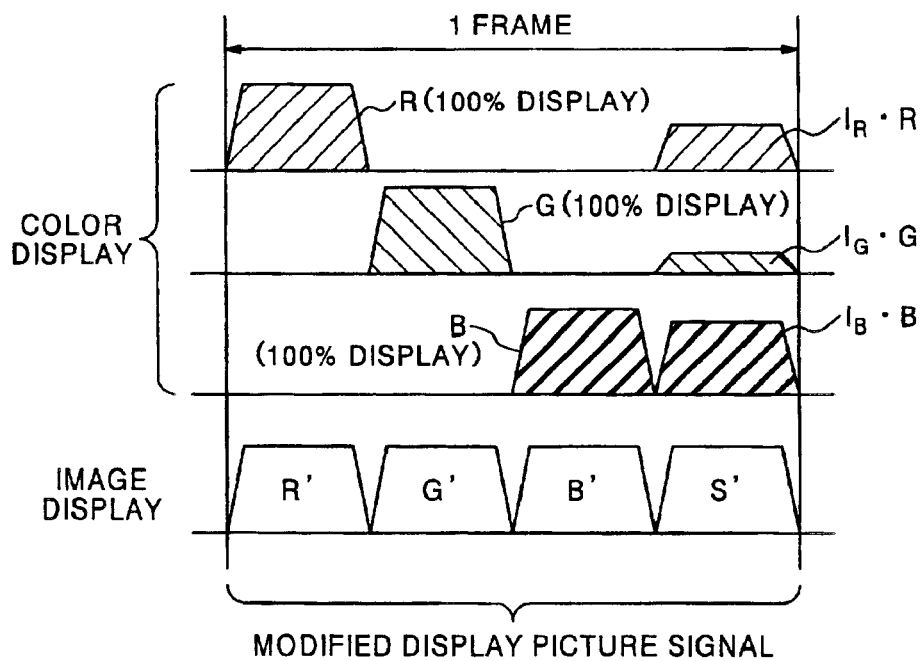
FIG. 11 is a chart showing a basic sequence for the field-sequential color display in the sixth through eighth embodiments.

FIG. 10 is a block diagram showing the aforementioned basic construction, and FIG. 11 is a chart showing a display sequence in the aforementioned basic construction. The field-sequential color display unit in the sixth through eighth embodiments is characterized in that the display color to be field-sequentially color displayed is determined in accordance with input image information and that picture signal is converted so as to be correspond to the display color to be outputted to a display device. To the display color to be field-sequentially color displayed, at least one display color (a non-three-primary color), which is different from three-primary colors of R, G and B, is added as a sub-field in addition to the three-primary colors of R, G and B. The added sub-field color is an intermediate color which is included in color gamut of display obtained by drawing a straight line between the chromaticity coordinates of the aforementioned three-primary colors, and may be a chromatic or an achromatic color. The added sub-field color is determined in accordance with image information. With respect to the display color, a value capable of most effectively reducing color breakup is presumed by carrying out a statistical calculation of the inputted image information and by referring to a color breakup prediction model. The color breakup prediction model means a weighted rate indicating the relationship between a picture signal value and the magnitude of occurrence of color breakup or a data structure which express a numerical table describing modified values or formulas for reducing color breakup with respect to the picture signal value. The color breakup artifact occurs if a plurality of sub-field images having different luminance and chromaticity are spatially shifted on retinas to be time-integrated. Therefore, the color breakup artifact conspicuously occurs if image information has a large picture signal value with respect to the same displaying region in a plurality of sub-fields.

For that reason, if image information (picture signal having luminance and chromaticity) is concentrated in one sub-field display period, it is possible to reduce color breakup. For example, if image information (r, g, b)=(255, 255, 0) is inputted, red and green are conventionally displayed at 100% to display yellow which is a synthesized color of red and green. In this case, the time difference occurs between the red image and the green image, so that color breakup occurs. In addition, the color difference between red and green is large, and red and green has high luminance, so that color breakup conspicuously occurs. If a sub-field of yellow is added and if the picture signal value is (r', g', b', y)=(0, 0, 0, 255), desired yellow is displayed only in the sub-field, so that color breakup does not occur theoretically. Thus, if a suitable sub-field is added on the basis of image information and if the image information is reallocated so that large picture signals are concentrated only in one sub-field image, it is possible to most effectively reduce color breakup.

In order to accomplish this object, as shown in FIG. 10, the field-sequential color display unit in the sixth through eighth embodiments comprises: an image evaluator 82 which evaluates image information of an inputted image on the basis of an inputted picture signal statistically; a sub-field controller 84 which determines a preferable sub-field color being added on the basis of the image information using a color breakup occurrence model; a picture signal converter 86 which converts the original picture signal on the basis of information on the added sub-field color; a color displaying part 90 displays desirable color; a display color controller 88 controls the color displaying part 90 in order to display a desired color in each sub-field on the basis of control information from the sub-field controller 84; and a monochrome image displaying part 92 outputting a picture signal, which is converted by the picture signal converter 86, to display an image.

The image evaluator 82 is designed to carry out a predetermined statistical process with respect to original picture signals of RGB signals for one frame. The sub-field controller 84 is designed to determine a color displaying in the sub-field, which is capable of most greatly reducing color breakup, by prediction with respect to the characteristics of the image obtained by the aforementioned statistical process. Herein, the original picture signals for one frame are statistically processed in the image evaluator 82, and the obtained value is used as an input parameter for the sub-field controller 84 to refer to a color breakup prediction model, which is provided in the sub-field controller, to determine an additional sub-field. As another case, the image evaluator 82 may include the color breakup prediction model and refer to the color breakup prediction model sequentially when picture signal for each pixel or one line is loaded and statistically processed, and in the statistical process, the magnitude of color breakup for every pixel is referred for weighted rate calculation. In either case, the fact that the statistical parameter including the influence of color breakup is used for the statistical calculation with respect to image information for one frame in order to determine the additional sub-field color on the basis of the statistical parameter in the sub-field controller 84 is same in both cases, so that there is no essential difference between both cases.

A Non-three-primary color signal is generated by the image evaluator 82, the sub-field controller 84 and the picture signal converter 86.

The color display controller 88 is designed to add a corresponding display color (a display color formed by synthesizing $I_R \cdot R$, $I_G \cdot G$, $I_B \cdot B$ shown in FIG. 11) on the basis of information determined by the sub-field controller 84 to control the color displaying part 90. On the other hand, the picture signal converter 86 is designed to convert and generate a picture signal for each sub-field from RGB signals (a picture signal S' shown in FIG. 11). Furthermore, the generating method of the display colors $I_R \cdot R$, $I_G \cdot G$, $I_B \cdot B$ will be described later. The converted picture signal is displayed on the monochrome image displaying part 92 by a predetermined driving part, so that the monochrome image displaying part 92 is linked with the color displaying part 90, which is driven in synchronism therewith, for displaying a color image.

Various methods for determining the sub-field color can be applied. The most desirable method is constructing a color breakup perception model and mapping the picture information in a human's perception space, which is linear to perceive color breakup, reducing the magnitude of the color breakup by the addition of a sub-field with a preferable color and a series of signal conversions. In order to cope with the color breakup artifact, the use of the CIE1976L*u*v* uniform color space or CIE1976L*a*b* uniform color space based on human's perception is convenient.

In addition, when the picture signal is converted, a conversion process based on a coordinate system capable of precisely expressing color information, such as the CIE1931XYZ color coordinate system, is preferably used for displaying a desired color image from the original image. However, human's uniform color space is non-linear with respect to RGB picture signals, so that the process can be carried out by an approximately simplified prediction in order to reduce the numbers of arithmetic circuits and memories. For example, producing a histogram using RGB signals may carry out the determination of the characteristics of image information and the image conversion process.

Alternatively, the number of processes can be effectively reduced if variation of colors for the added sub-field is previously restricted to determine the optimum color from a plurality of candidates thereof. For example, it is effective to set four sets of White, Cyan, Magenta and Yellow as candidates. These additional sub-field colors preferably have chromaticity coordinate values which are obtained by simply combining and adding RGB signals, or chromaticity coordinate values which are obtained by combinations based on the binary control of each of RGB colors of the color displaying part 90 (e.g., the lighting and non-lighting of RGB light sources, or ON and OFF of a color filter). The former can simplify the signal processing since it is not required to carry out matrix operations, and the latter can simplify the driving circuit in the color displaying part to increase the number of options of the device system constituting the color displaying part.

Moreover, when image evaluation is carried out, all of picture signals of one frame are not required in the statistical process. For example, only a predetermined picture signal values or the values higher than the predetermined level in the range of from 0 to 255 may be used for calculation, so that significant image information for color breakup may be picked up by the filtering process to partially carry out the statistical process. For example, only picture signal of which the upper 3 bits are not 0, i.e., a signal level higher than or equal to 32 in the range from 0 to 255 levels, which are expressed by 8 bits, can be extracted to carry out a statistical processing calculation. In addition, when the statistical process is carried out, if only some upper bits of the picture signal level are used for the calculation, it is possible to reduce the scale of the calculating circuit and improve the processing speed.

Moreover, if all of picture signals with respect to all of pixels are not used and if picture signals for a statistical process are restricted to several pixels to carry out the statistical process, it is possible to efficiently evaluate an image.

When a plurality of additional sub-fields are used, the optimum displaying part is obtained by carrying out the loop process using the converted picture signal as an input picture signal. In this case, since dominant image components to color breakup are sequentially reduced, it is possible to obtain effects if a part of the process is omitted or approximated in order to increase the processing speed.

As the color displaying part 90, one using a light source capable of controlling the three-primary colors independently, or a color filter capable of changing a display color other than the three-primary colors is applicable. As the light source, there are LEDs for emitting each of the three-primary colors, fluorescent lamps similar thereto, EL (Electro-Luminescence) elements, and flash lamps. In these light sources, LEDs are very desirable since the LEDs have high color purity and are easy to change the intensity of each emission by controlling currents. In this construction, a non-emissive display unit such as a light valve, i.e., LCD (Liquid Crystal Display) is desirable as the image displaying part 92. In an LCD, in order to change displaying rapidly, a bend alignment cell or a vertically aligned homogeneous cell is suitable in the case of using nematic liquid crystal materials. In the case of using smectic liquid crystal materials, a ferroelectric or antiferroelectric liquid crystal cell or a V-shaped response liquid crystal cell is preferably used as the displaying part.

As the latter color filter, a liquid crystal color shutter capable of changing the display color electrically is desirable. A typical liquid crystal color shutter comprises two liquid crystal cells, and is capable of displaying three colors selected from four colors, which can be obtained by combinations of binary switching. For example, if one liquid crystal cell is added, the liquid crystal color shutter can display 8 (=$2^3$) colors. A liquid crystal color shutter comprising three liquid crystal cells proposed by G.D. Sharp, et al. (see U.S. Pat. No. 5,929,946) is more preferable since it is possible to change the display color if the multi-valued control is carried out.

(Sixth Embodiment)

Referring to FIGS. 7 through 12, a field-sequential color display unit according to the sixth embodiment of the present invention will be described below.

Figure 12:
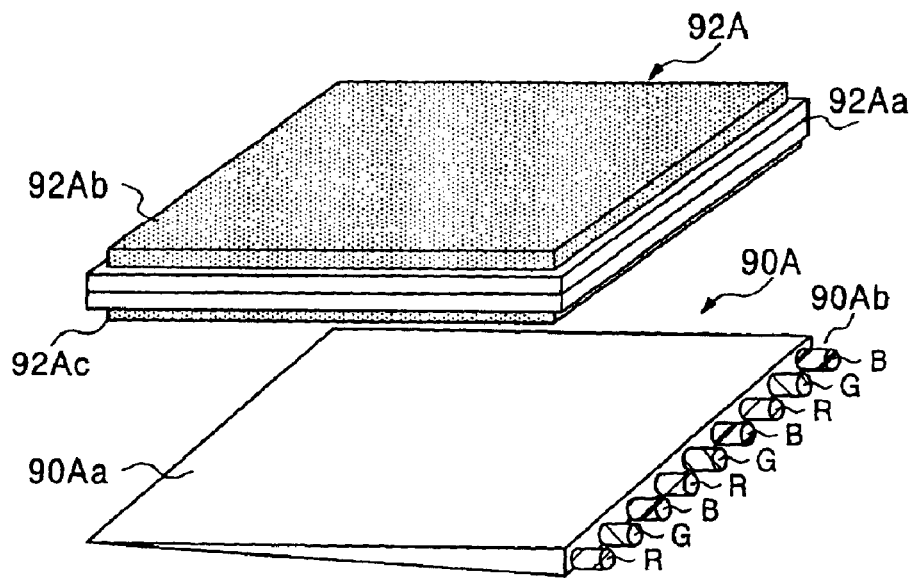
FIG. 12 is an illustration showing the construction of a color displaying part and an image displaying part in the sixth embodiment.

The field-sequential color display unit in this embodiment basically has a construction shown in FIG. 10. As shown in FIG. 12, the color displaying part 90 is a backlight 90A comprising a light guide plate 90Aa and an LED light source 94Ab having three-primary colors, and the monochrome image displaying part 92 is an active matrix liquid crystal display unit (which will be also hereinafter referred to as an AM-LCD) 92A having no color filter. The field-sequential color display unit is designed to display a color image by illuminating the LCD 92A with the backlight 90A from the backside of the LCD. The LCD 92A shown in FIG. 12 comprises a liquid crystal cell 92Aa, and polarizers 92Ab, 92Ac which are arranged so as to sandwich the liquid crystal cell therebetween.

Figure 13:
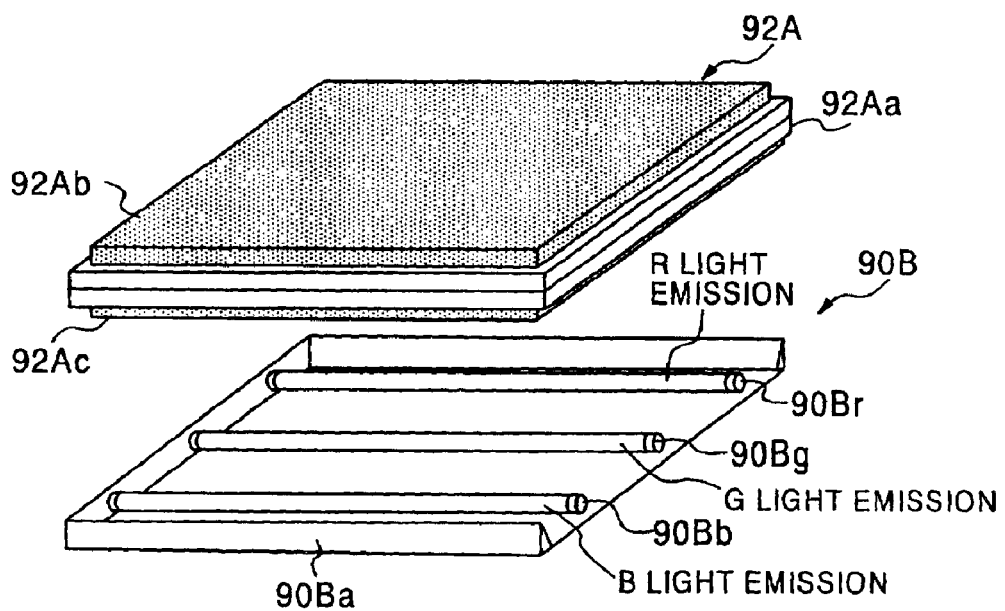
FIG. 13 is an illustration showing another construction of a color displaying part and an image displaying part in the sixth embodiment.

Furthermore, the field-sequential color display unit may comprise a reflective LCD as the monochrome image displaying part 92, and a frontlight of LEDs as the color displaying part. Alternatively, the field-sequential color display unit may use an RGB-cold cathode fluorescent lamp as a light source serving as a backlight. The construction in the latter is shown in FIG. 13. In FIG. 13, a monochrome display LCD 92A is used as the image display, and a backlight 90B having RGB-cold cathode fluorescent lamps 90Br, 90Bg, 90Bb, which are provided in a backlight unit 90Ba, as the color display.

In all cases, a rapid response liquid crystal having a response speed of 2 ms or less is used as the material of the liquid crystal of the LCD, and display is carried out at a frame frequency of 50 Hz or more. The display color may be changed by the plane-sequential by which the whole display information is simultaneously changed, or by the scroll changing by which the display information is partially changed.

In this embodiment, as shown in FIG. 12, the LED backlight 90A for RGB colors is used as the backlight for controlling the display color in the fourth sub-field by its intensity ratio.

Figure 14:
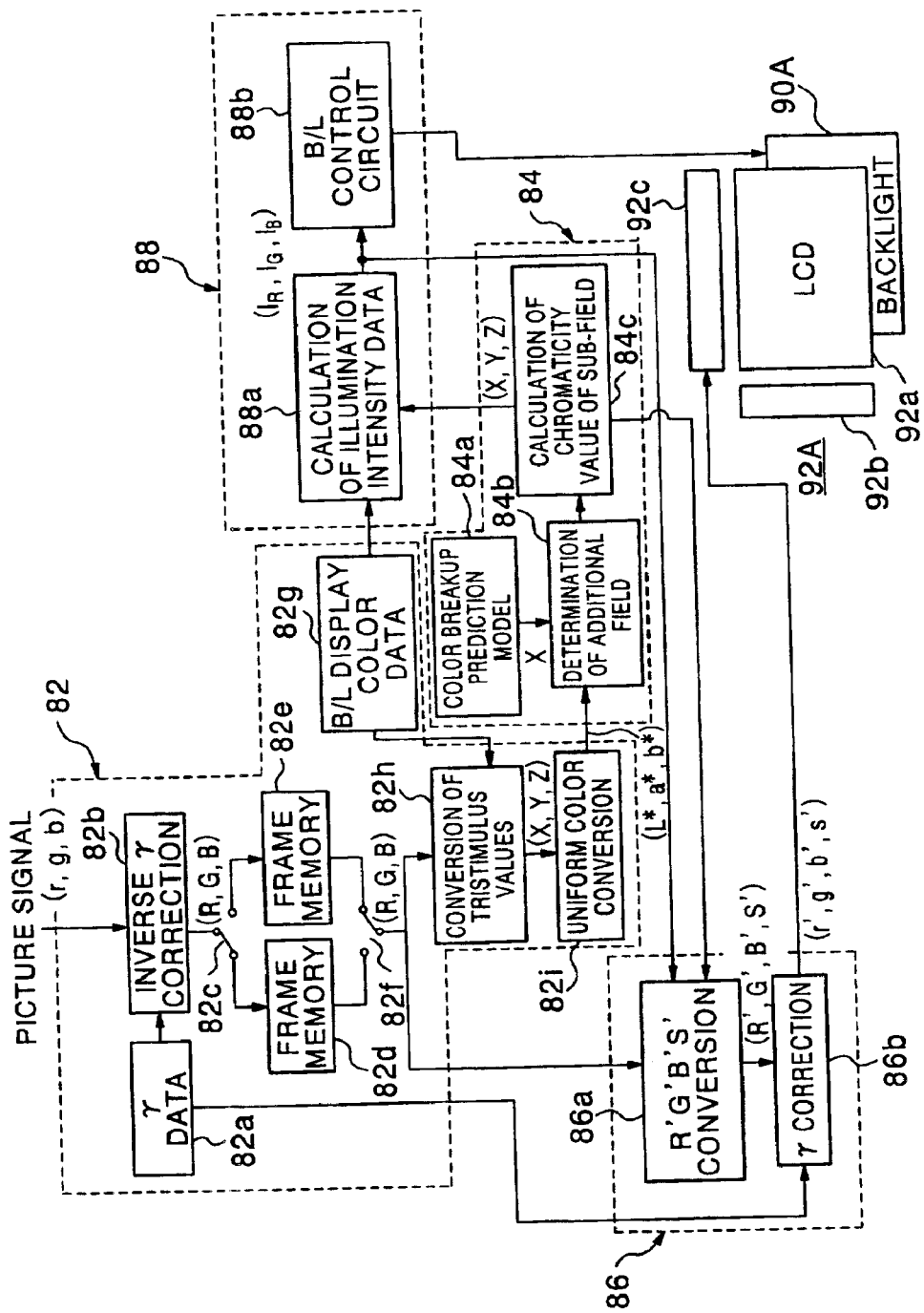
FIG. 14 is a block diagram showing the construction of the sixth embodiment.

The construction of the field-sequential color display unit in this embodiment is shown in FIG. 14. The field-sequential color display unit in this embodiment comprises an image evaluator 82, a sub-field controller 84, a picture signal converter 86, a display color controller 88, a LED backlight 90A, and a monochrome LCD 92A, and is designed to determine the display color in the fourth sub-field on the basis of image information to convert a picture signal to output signal as an input signal of LCD.

The image evaluator 82 comprises aγ data storing part 82a, an inverse gamma correction part 82b, switches 82c, 82f, sub-memories 82d, 82e, a B/L (backlight) color data storing part 82g, a tristimulus values converter 82h, and an uniform color space converter 82i. The sub-field controller 84 comprises a color breakup prediction model 84a, an additional sub-field determining part 84b, and a sub-field chromaticity coordinates value calculating part 84c. The picture signals converter 86 comprises an R'G'B'S' converter 86a, and a gamma correction part 86b. The display color controller 88 comprises an illumination intensity data calculating part 88a, and a B/L control circuit 88b. The LCD 92A comprises a display 92a, a scanning line driving circuit 92b, and a signal line driving circuit 92c.

Figure 15:
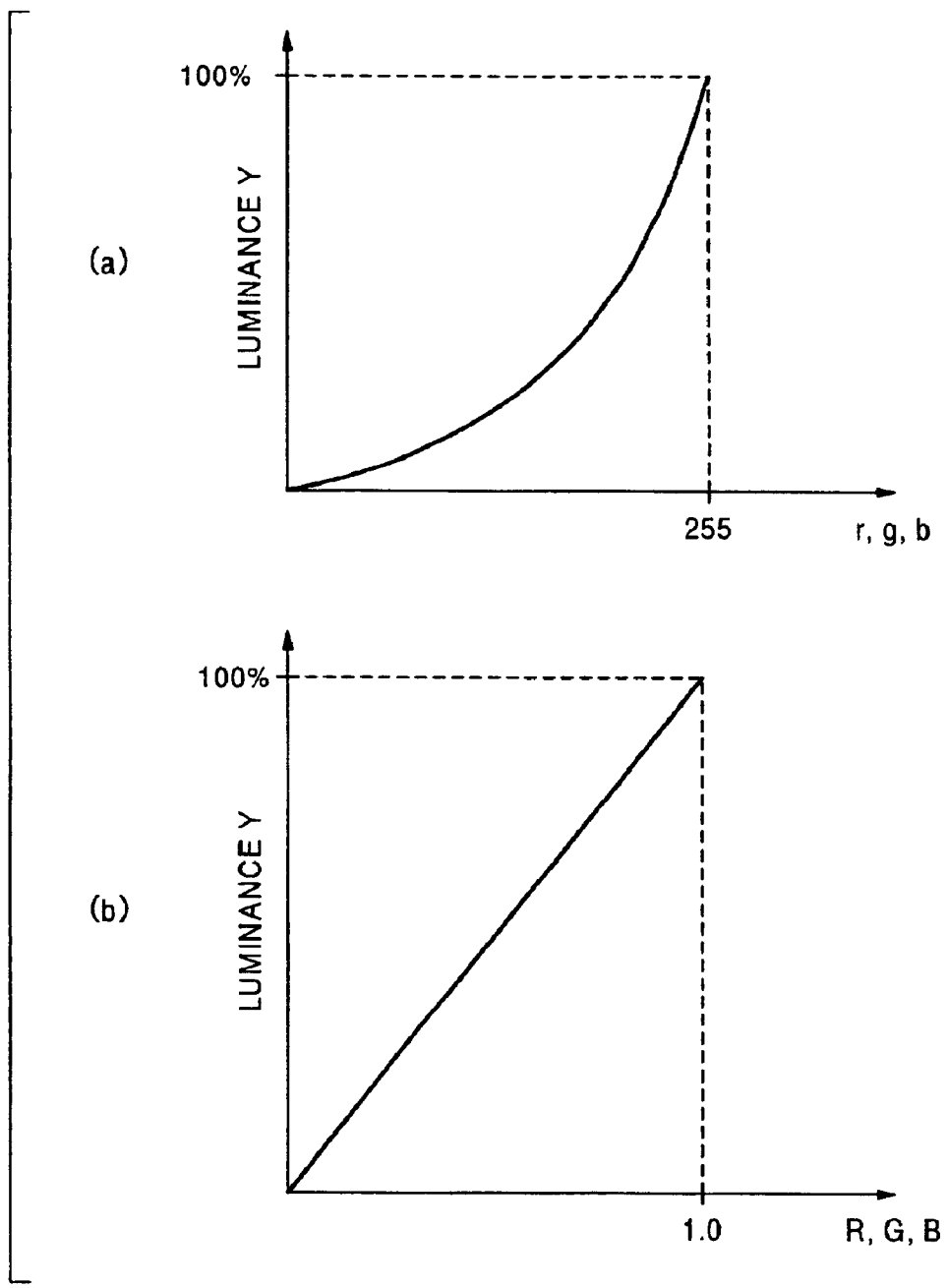
FIG. 15 is a graph for explaining characteristics of an image evaluation part in the sixth embodiment.

The construction and operation shown in FIG. 14 will be described below in detail.
① Evaluation of Picture Signal An inputted RGB original picture signal is indicated by (r, g, b) wherein r, g and b are R, G and B components of the original picture signal. Since this signal has been corrected in view of the γ characteristics of a display device (usually a CRT (Cathode Ray Tube)), the non-linear signal-luminance characteristics are as shown in FIG. 15(a). Therefore, an inverse gamma correction is carried out by the inverse gamma correction part so that the signal-luminance characteristics are linear as shown in FIG. 15(b). For example, if γ=2.2 and if (r, g, b) is an 8-bit digital signal, picture signals (R, G, B) after the inverse gamma correction are expressed as follows:

$$R=[r/(2^8-1)]^{2.2}$$
$$G=[g/(2^8-1)]^{2.2}$$
$$B=[b/(2^8-1)]^{2.2} \quad (1)$$

wherein γ=2.2 is a coefficient used for the CRT.

The picture signals (R, G, B) for one frame after the inverse gamma correction are stored in the frame memory 82d or frame memory 82e via the switch 82c. The frame memories 82d, 82e can process the n-th frame data loading, and the (n+1)-th frame data writing for asynchronously using a method such as a bank switching.

The image data stored in the frame memories 82a, 82e are sequentially loaded and re-mapped on the color space coordinates in order to evaluate the magnitude of color breakup. The color space coordinates mean coordinates which indicate color information of a picture signal directly, and chromaticity coordinates also have the same meaning.

Specifically, the color space coordinates indicate tristimulus values in the 1931CIEXYZ color system, Y-value (luminance) and xy chromaticity coordinate values, L*a*b* coordinate values in the CIE1976L*a*b* uniform color space, L*u*v* coordinate values in the CIEL*u*v* uniform color space, and so forth. In this embodiment, tristimulus values are converted from the display color data 82g of the LED backlight in the tristimulus values converter 82h, and mapping on the uniform color space, which is non-linear coordinate conversion, is carried out in the uniform color converter 82i, so that a color breakup prediction is carried out on a coordinate system which is more faithful to human's perception.

Figure 16:
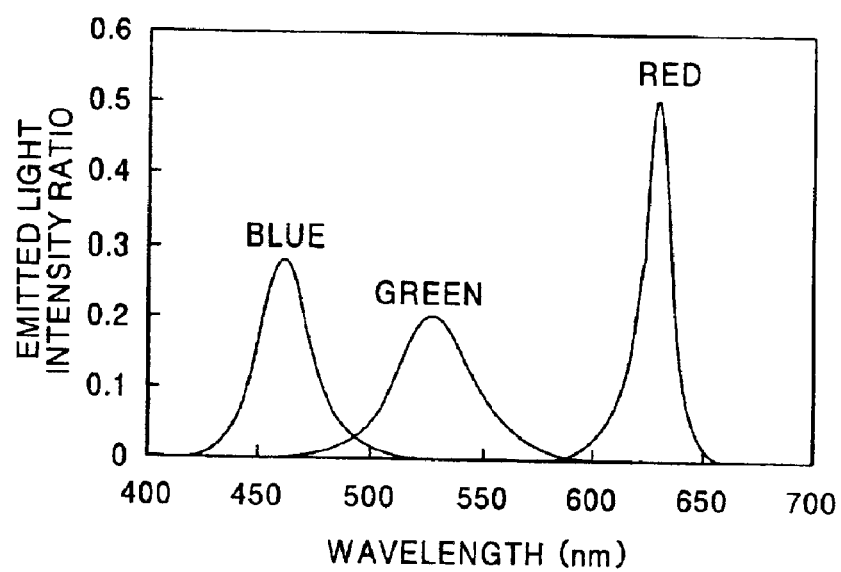
FIG. 16 is a graph showing RGB-emissive dispersions and intensity ratios of LED-light source.

An example of RGB-emissive dispersion curves and intensity ratios of a LED light source are shown in FIG. 16. The conversion of the picture signals (R, G, B) into tristimulus values (X, Y, Z) in the 1931CIEXYZ color system is related by the following expression:

$$\begin{pmatrix} X \\ Y \\ Z \end{pmatrix} = \begin{pmatrix} X_R & X_G & X_B \\ Y_R & Y_G & Y_B \\ Z_R & Z_G & Z_B \end{pmatrix} \begin{pmatrix} R \\ G \\ B \end{pmatrix} + \begin{pmatrix} X_K \\ Y_K \\ Z_K \end{pmatrix} \quad (2)$$

wherein $(X_R, Y_R, Z_R)$ denotes tristimulus values in the case of R displaying, i.e., (R, G, B)=(1, 0, 0), on the condition that the fourth sub-field is black (the backlight does not emit light). In the case of black displaying, i.e., (X, Y, Z)=$(X_K, Y_K, Z_K)$, $X_K=Y_K=Z_K=0$ in the ideal condition. In addition, the conversion expressions to the CIE1976L*a*b* uniform color space used in this embodiment are expressed as follows:

$$L^*=116(Y/Y_W)^{1/3}-16$$
$$a^*=500[(X/X_W)^{1/3}-(Y/Y_W)^{1/3}]$$
$$b^*=200[(Y/Y_W)^{1/3}-(Z/Z_W)^{1/3}] \quad (3)$$

wherein $(X_W, Y_W, Z_W)$ denote tristimulus values in the case of (R, G, B)=(1, 1, 1), i.e., white displaying.
② Determination of Additional Sub-Field On the basis of the mapped image information, the color breakup prediction model 84a is used for determining color of an additional sub-field in the additional sub-field determining part 84b, and the chromaticity values in the added sub-field are determined by the sub-field chromaticity value calculating part 84c.

Several models for predicting color breakup are applicable. Color breakup is easily recognized when displayed color is an achromatic and its luminance is high level, and/or when chromaticity of displayed color is high and the hue-difference is high between colors continuously displayed. In addition, even if luminance of two colors is same, the visual sensitivity as a spatial frequency in an r-b hue direction is different from that in a y-b hue direction. In view of the foregoing, the additional sub-field may be selected so as to reduce color breakup most effectively. For example, a weighting for each picture signal about the magnitude of color breakup is carried out in the L*, a*, b* directions in order to determine a chromaticity vector ($X_S$, $Y_S$, $Z_S$) which is to be added by the weighted averaging in the color breakup-uniform color space. As an example of weighting, it is applicable that the weighted ratio is set as L*:a*:b*= 4:1:3, or that only values of b*>0 and L* of a predetermined value or more are averaged, since color breakup is easily recognized in W and Y displays having high lightness.

For example, it is assumed that the coordinates of the center of gravity (L', a', b')=(380, −5, 260) is obtained if a color breakup uniform color space (L', a', b') is defined by L'=4L*, a'=a*, b'=3b* (b*≧0) and b'=b* (b*<0) and pick up only picture signals of L*≧30 from that for each pixel. Assuming herein that the white point is ($X_W$, $Y_W$)=(0.313, 0.329) in the xy chromaticity coordinate system, the tristimulus values ($X_W$, $Y_W$, $Z_W$) at the white point in the CIE1931XYZ color system are obtained as ($X_W$, $Y_W$, $Z_W$)= (95.05, 100, 108.9) by standardizing to $Y_W$=100 on the basis of the relationships of $x_W = X_W/(X_W+Y_W+Z_W)$, $y_W=Y_W/(X_W+Y_W+Z_W)$, and $z_W=1-x_W-y_W=Z_W/(X_W+Y_W+Z_W)$. At this time, the additional chromaticity vector ($X_S$, $Y_S$, $Z_S$) is (80.7, 87.6, 14.8) by expression (3).

Furthermore, the color breakup coordinate space has been herein defined by the CIE1976L*a*b* uniform color space, other color systems or uniform color spaces may be used. For example, the CIEL*u*v* uniform color space may be applied as the color breakup uniform color space.

③ Backlight Control

The LED light source intensity ratios of RGB colors are determined by the illumination intensity data calculating part 88a in accordance with the chromaticity values in the additional sub-field. Such a method may be carried out by the inverse conversion of the aforementioned (R, G, B)→(X, Y, Z) conversion matrix, and is expressed as follows.

$$\begin{pmatrix} R_S \\ G_S \\ B_S \end{pmatrix} = \begin{pmatrix} X_R & X_G & X_B \\ Y_R & Y_G & Y_B \\ Z_R & Z_G & Z_B \end{pmatrix}^{-1} \begin{pmatrix} X_S - X_K \\ Y_S - Y_K \\ Z_S - Z_K \end{pmatrix} \quad (4)$$

The obtained RGB intensity ratios ($R_S$, $G_S$, $B_S$) are the LED light source intensity ratios in the additional sub-field, and the intensity of the LEDs being the maximum intensity of RGB colors is standardized as 100%. Assuming that the intensities of the standardized LEDs are ($I_R$, $I_G$, $I_B$), the following expressions are established:

$I_R = R_S/\text{Max}\ (R_S, G_S, B_S)$ $I_G = G_S/\text{Max}\ (R_S, G_S, B_S)$ $I_B = B_S/\text{Max}\ (R_S, G_S, B_S)$ wherein Max ($R_S$, $G_S$, $B_S$) denotes the maximum value of $R_S$, $G_S$ and $B_S$. The intensities $R_S$, $G_S$ and $B_S$ are fed to the B/L control circuit 88b to control the backlight 90A.

For example, assuming that $$\begin{pmatrix} X_R & X_G & X_B \\ Y_R & Y_G & Y_B \\ Z_R & Z_G & Z_B \end{pmatrix} = \begin{pmatrix} 41.24 & 35.76 & 18.05 \\ 21.26 & 71.52 & 7.22 \\ 1.93 & 11.92 & 95.05 \end{pmatrix}, X_K = Y_K = Z_K = 0,$$

the following expression is established from ($X_S$, $Y_S$, $Z_S$)= (80.7, 87.6, 14.8) which is calculated in ②.

$$\begin{pmatrix} R_S \\ G_S \\ B_S \end{pmatrix} = \begin{pmatrix} 41.24 & 35.76 & 18.05 \\ 21.26 & 71.52 & 7.22 \\ 1.93 & 11.92 & 95.05 \end{pmatrix}^{-1} \begin{pmatrix} 80.7 \\ 87.6 \\ 14.8 \end{pmatrix} = \begin{pmatrix} 1.195 \\ 0.868 \\ 0.022 \end{pmatrix}$$

Therefore, the standardized LED intensity ratios are ($I_R$, $I_G$, $I_B$)=(1.9, 0.73, 0.02).

④ Image Conversion Process

The picture signals are converted so as to display a desired image by the four sub-field displays including the display color of the additional sub-field. The conversion method, such as direct conversion from RGB signals, converting using tristimulus values is applicable. Both methods provide basically same conversion results, but the former method is simpler than the latter.

[Directly Converting Method]

The picture signals are converted so that the minimum signal level of (R, G, B) signals is displayed in the additional sub-field. Assuming that the signal level in the additional sub-field is S', the following expression is established:

$$S' = \text{Min}\ (R/I_R, G/I_G, B/I_B) \quad (6)$$

wherein Min ($R/I_R$, $G/I_G$, $B/I_B$) denotes the minimum value of $R/I_R$, $G/I_G$ and $B/I_B$. The signal levels (R', G', B') in the RGB sub-field are given by the differential signals of S' as follows.

$R' = R - S'I_R$ $G' = G - S'I_G$ $B' = B - S'I_B \quad (7)$

From the aforementioned conditions, Min (R', G', B')=0.

[Method for Converting Tristimulus Values]

The relationship between the tristimulus values (X, Y, Z) and (R', G', B', S') signals is as follows.

$$\begin{pmatrix} X \\ Y \\ Z \end{pmatrix} = \begin{pmatrix} X_R & X_G & X_B & X_S \\ Y_R & Y_G & Y_B & Y_S \\ Z_R & Z_G & Z_B & Z_S \end{pmatrix} \begin{pmatrix} R' \\ G' \\ B' \\ S' \end{pmatrix} + \begin{pmatrix} X_K \\ Y_K \\ Z_K \end{pmatrix} \quad (8)$$

Since this inverse conversion matrix cannot be identically obtained, the optimum conversion signal is obtained by inverse converting three kinds of partial conversion matrixes to which S' is added. That is, a set of optimum signal levels is selected from the following expressions.

$$\begin{pmatrix} R' \\ G' \\ B' \end{pmatrix} = \begin{pmatrix} X_R & X_G & X_S \\ Y_R & Y_G & Y_S \\ Z_R & Z_G & Z_S \end{pmatrix}^{-1} \begin{pmatrix} X - X_K \\ Y - Y_K \\ Z - Z_K \end{pmatrix} \quad (9)$$

$$\begin{pmatrix} G' \\ B' \\ S' \end{pmatrix} = \begin{pmatrix} X_G & X_B & X_S \\ Y_G & Y_B & Y_S \\ Z_G & Z_B & Z_S \end{pmatrix}^{-1} \begin{pmatrix} X - X_K \\ Y - Y_K \\ Z - Z_K \end{pmatrix} \quad (10)$$

$$\begin{pmatrix} R' \\ B' \\ S' \end{pmatrix} = \begin{pmatrix} X_R & X_B & X_S \\ Y_R & Y_B & Y_S \\ Z_R & Z_B & Z_S \end{pmatrix}^{-1} \begin{pmatrix} X - X_K \\ Y - Y_K \\ Z - Z_K \end{pmatrix} \quad (11)$$

This method can be explained that three of four axes of coordinates, which are obtained by adding S-axis to the RGB coordinate system, are selected as principal axes to use the selected three principal axes to indicate the coordinates of picture signal values. This method is also equivalent to the fact that the triangle including the chromaticity coordinates of the picture signals is extracted from three triangles, the apexes of these triangles are the S' chromaticity coordinates and two coordinates of the RGB colors in the xy chromaticity coordinate system, to express the chromaticity coordinates of the picture signals using the chromaticity values at the apexes of the extracted triangle.

The converted picture signals (R', G', B', S') are converted into driver input signals (r', g',b', s')by carrying out a gamma correction by means of the gamma correction part in view of the gray scale level-luminance characteristics of the LCD. The driver input signals are fed to the LCD 92A.

Thus, it is possible to generate the additional sub-field, the emission intensities ($I_R$, $I_G$, $I_B$) therein, and output picture signals (r', g', b', s'), from one frame image information of the input picture signals (r, g, b).

As described above, according to the field-sequential color display unit in this embodiment, it is possible to reduce color breakup with respect to any inputted image without greatly increasing the sub-field frequency, since the color of the additional sub-field is selected from the non-three-primary colors.

Figure 27:
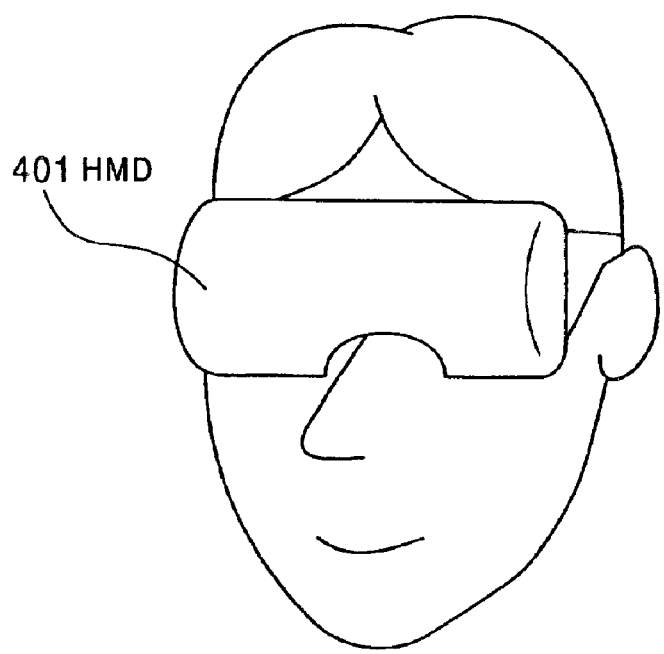
FIG. 27 is an outside drawing of an example of an HMD in the sixth embodiment.

FIG. 27 is an illustration showing an example to which the sixth embodiment is applied. In this example, a spectacle type-image display unit covering the forward field of view of an observer, a so-called HMD (Head Mounted Display), is used.

Figure 28:
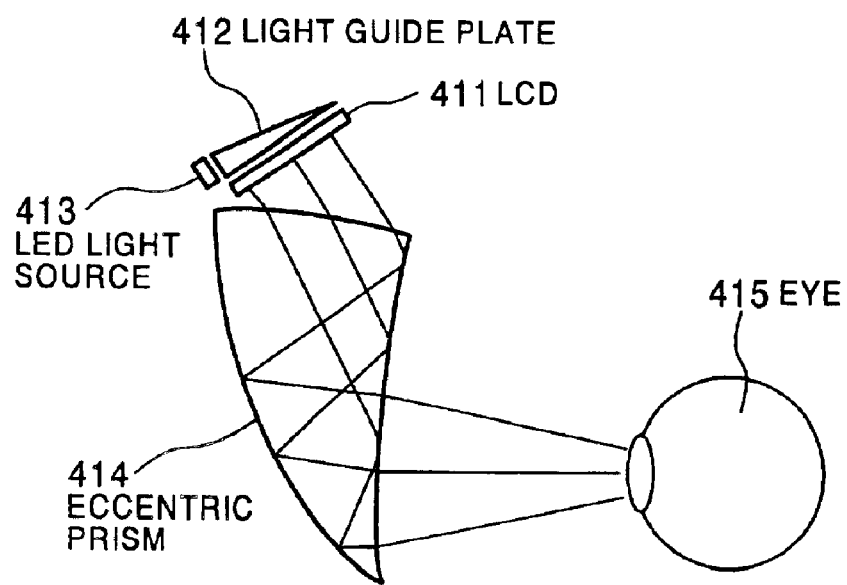
FIG. 28 is an illustration showing the construction of an example of a HMD in the sixth embodiment.

FIG. 28 is an illustration showing the construction of this example as a cross section. The observer observes an image, which is displayed on an LCD 411, via an eccentric prism 414. Incident light to the observer's eye 415 from the LCD 414 is refracted and reflected including total reflection on the surface of the eccentric prism 414 serving as an enlarging optical system repeatedly, so that the image is enlarged. The refracting surface and reflecting surface of the eccentric prism 414 are formed by free-form-surfaces in order to correct trapezoid distortion and aberration resulting from an eccentric optical system.

As described in detail in FIG. 12, the LCD 411 is a monochrome and transmissive light valve. Illuminating light, which is emitted from a LED light source 413 for time-sequentially emitting light of RGB colors and the non-three-primary colors, is caused to be surface emission by a light guide plate 412 to illuminate the LCD 411 from the back in synchronism with the switching of the image to obtain a field-sequential color display.

Furthermore, for simplification, FIG. 28 shows only the LCD 411 serving as an image displaying part, an RGB backlight, which serves as a color display and comprises the light guide plate 412 and the LED light source 413, and the eccentric prism 414 serving as an observation optical system, and other elements are omitted from FIG. 28.

Alternatively, the image displaying part may be a reflective LCD, and the color display may be a LED-frontlight. In place of the LED, RGB-cold cathode fluorescent lamps may be used as shown in FIG. 13.

The construction of the HMD should not be limited to that in this example. In place of the spectacle type-image display unit, a helmet mounted type or headband mounted type-image display unit is applicable. The concept of the aforementioned HMD includes a field-sequential color display unit for observing an image, which is optically enlarged by an enlarging optical system, even if it is not mounted. In addition, the enlarging optical system does not only comprise the eccentric prism, but it may also use a concave mirror or a relay lens.

(Seventh Embodiment)

Referring to FIGS. 17 through 20, a field-sequential color display unit according to the seventh embodiment of the present invention will be described below.

Figure 17:
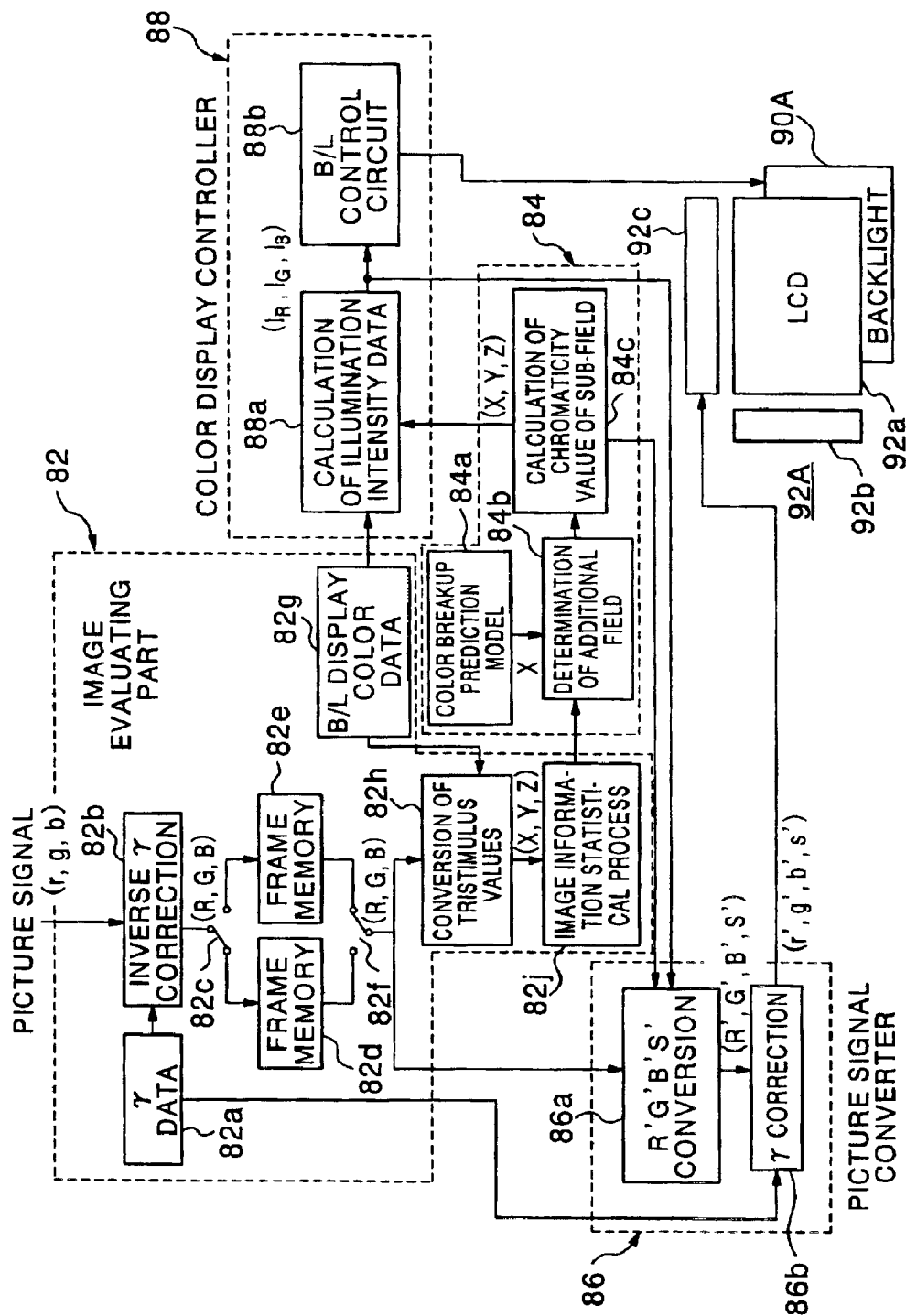
FIG. 17 is a block diagram showing the construction of the seventh embodiment.

The construction of the field-sequential color display unit in this embodiment is shown in FIG. 17. In the field-sequential color display unit in this embodiment, an image evaluator 82A is substituted for the image evaluator 82 of the field-sequential color display unit in the sixth embodiment shown in FIG. 14. In the image evaluator 82A, an image information statistical processing part 82j is substituted for the uniform color converging part 82i of the image evaluator 82 shown in FIG. 14. In order to reduce the calculation load, the conversion to the CIE1976L*a*b* uniform color space may not be applied, and an additional sub-field determining process and a display signal converting process may be carried out on the basis of an image information statistical process using the CIE1931XYZ color system which is similarly indicative of color coordinate values.

The construction and operation of this embodiment will be described below.

In this embodiment, the emission wavelength distributions of red (R), green (G) and blue (B) emission colors in a LED backlight have characteristics shown in FIG. 16. From these emission wavelength distributions, the color coordinates of the three-primary colors are R color ($X_R$, $Y_R$)=(0.6928, 0.3067), G color ($X_G$, $Y_G$)=(0.2179, 0.7008), and B color ($X_B$, $Y_B$)=(0.1391, 0.0524) on the CIE xy chromaticity diagram. In addition, when all of LEDs of RGB-colors are caused to emit light at 100% output, the xy chromaticity coordinates in the case of white (W) displaying are ($X_W$, $Y_W$)=(0.310, 0.316).

Figure 18:
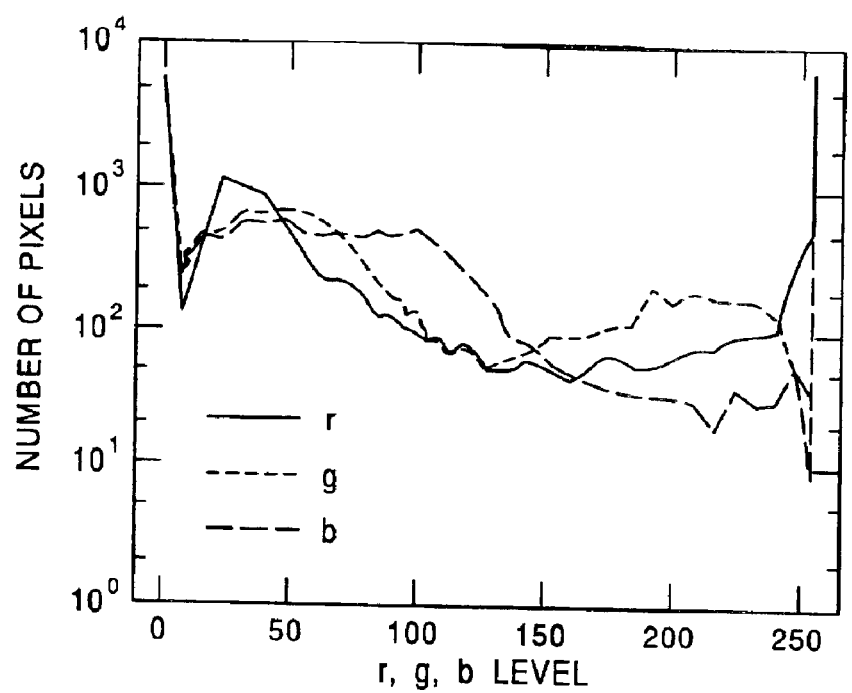
FIG. 18 is a histogram showing the three-primary color signal values of an 8-bit input original picture signal on each screen in the whole image.

FIG. 18 is a graph showing a histogram of signal values (r, g, b) of the whole certain input original image having signal levels in a range of 8-bit input, i.e., in the range of from 0 to 255, on each picture. The input picture signals (r, g, b) have gamma characteristics expressed by expression (1), and the input signals (r, g, b) in each picture signal are sequentially converted into (R, G, B) by the inverse gamma correction part 82b in FIG. 17.

The picture signals (R, G, B) after the inverse gamma correction are converted into (X, Y, Z) values in the CIE1931XYZ color system by the tristimulus values converter 82h based on a conversion expression (17) which will be described later. Coefficients required for conversion are previously calculated as backlight color data to be stored as data. These conversion coefficients are derived by the following procedure.

The chromaticity characteristics of the aforementioned LED backlight satisfy the relationship expressed by expressions (12), $$X_W = X_R + X_G + X_B$$

$$Y_W = Y_R + Y_G + Y_B$$

$$Z_W = Z_R + Z_G + Z_B \qquad (12)$$

and the relationship between XYZ tristimulus values and xyz color values is expressed by expressions (13):

$$x = X/(X+Y+Z)$$

$$y = Y/(X+Y+z)$$

$$x+y+z=1 \qquad (13)$$

wherein it is assumed that $$(X_K, Y_K, Z_K) = (0, 0, 0) \qquad (14)$$

since XYZ chromaticity coordinates during a black displaying, i.e., during a light is not emitted or can be ignored. If the relational expression of the LED backlight is expressed in accordance with expression (2) using $k_W$, $k_R$, $k_G$ and $k_B$ as proportional coefficients from expressions (12), (13) and (14), the following expression is established (expression (2) is a general formula which does not only indicate picture signals and color values, but which also indicate the relationship between the intensity of each of backlights of the three-primary colors and illumination color).

$$\begin{pmatrix} 0.31 k_W \\ 0.32 k_W \\ 0.37 k_W \end{pmatrix} = \begin{pmatrix} 0.69 k_R & 0.22 k_G & 0.14 k_B \\ 0.31 k_R & 0.70 k_G & 0.05 k_B \\ 0 & 0.08 k_G & 0.81 k_B \end{pmatrix} \begin{pmatrix} 1 \\ 1 \\ 1 \end{pmatrix} \quad (15)$$

The ratios of the proportional coefficients $k_W$, $k_R$, $k_G$ and $k_B$ are derived from expression (15), and the respective elements in expression (2) are derived by standardizing the luminance value $Y_W$ as 100, i.e., 100% in the case of white displaying: (R, G, B)=(1, 1, 1).

$$\begin{pmatrix} X_R & X_G & X_B \\ Y_R & Y_G & Y_B \\ Z_R & Z_G & Z_B \end{pmatrix} = \begin{pmatrix} 56.4 & 25.6 & 13.2 \\ 33.3 & 60.6 & 6.1 \\ 3.5 & 12.9 & 92.4 \end{pmatrix} \quad (16)$$

Therefore, the relationship between both detection signals (R, G, B) after the gamma correction and color values X, Y and Z, which should be displayed by both image signals, are expressed as follows:

$$\begin{pmatrix} X \\ Y \\ Z \end{pmatrix} = \begin{pmatrix} 56.4 & 25.6 & 13.2 \\ 33.3 & 60.6 & 6.1 \\ 3.5 & 12.9 & 92.4 \end{pmatrix} \begin{pmatrix} R \\ G \\ B \end{pmatrix} \quad (17)$$

wherein it is assumed that $$(X_K, Y_K, Z_K) = (0, 0, 0) \quad (18)$$

since the contrast of the LCD 92A is enough, i.e., the display luminance can be ignored during the black displaying: (R, G, B)=(0, 0, 0).

Figure 19:
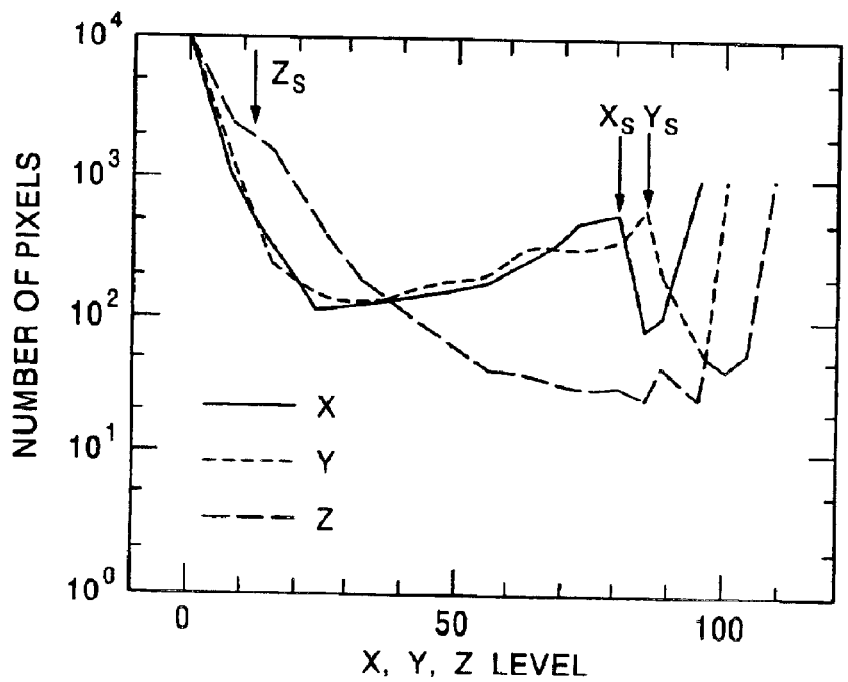
FIG. 19 is a histogram showing the picture signal values after the XYZ conversion in the seventh embodiment.

By the aforementioned XYZ conversion, picture signal information of the input image was stored in the XYZ displaying system to be statistically processed. FIG. 19 shows an example where picture signal values after the XYZ conversion are expressed as a histogram. On the basis of this image statistical result, the color breakup prediction model 84a is used for determining color of an additional sub-field in the additional sub-field determining part 84b. The color breakup prediction model in this embodiment is based on predictions:

① color breakup is easy to occur in a portion wherein the frequency of signal levels having high luminance (Y value) is large;

② color breakup is easy to occur if the frequency of X values is higher than that of Z values; and ③ color breakup is easy to occur in a portion having high Z values in the case that both X and Y values are low, and each signal level fitting these conditions ①~③ was selected as the color of the fourth sub-field which is an additional sub-field. The respective values are derived in the sub-field chromaticity coordinates calculating part 84c. For example, it is assumed that $$(X_S, Y_S, Z_S) = (78, 85, 12) \quad (19)$$

using FIG. 19.

Then, from the XYZ color values of the additional sub-field, the RGB illumination intensity ratios of the LED backlight are calculated in the illuminating intensity data calculating part 88a. The illuminating intensity ratios ($I_R$, $I_G$, $I_B$) are derived from deriving ($R_S$, $G_S$, $B_S$) and standardizing them expression (5). Specifically, the inverse conversion of expression (17) is given by the following expression:

$$\begin{pmatrix} X_R & X_G & X_B \\ Y_R & Y_G & Y_B \\ Z_R & Z_G & Z_B \end{pmatrix}^{-1} = \begin{pmatrix} 0.0234 & -0.0093 & -0.0027 \\ -0.0130 & 0.0219 & 0.0004 \\ 0.0009 & -0.0027 & 0.0109 \end{pmatrix} \quad (20)$$

Therefore, from expressions (4) and (5), the following expression is derived.

$$(I_R, I_G, I_B) = (1.0, 0.8, 0.3) \quad (21)$$

Thus, control information that the R, G and B color LEDs of the LED backlight in the fourth sub-field should be illuminated as 100%, 80% and 30% outputs, is respectively obtained. On the basis of this information, the B/L control circuit controls the backlight 90A.

On the other hand, using the results of expression (21) and expressions (6) and (7) with respect to the respective picture signal values, signal levels R', G', B' in the respective RGB-sub-fields and a signal level S' in the additional sub-filed are obtained by the R'G'B'S' converter 86a. Then, in the gamma correction part 86b, LCD display signal levels (r', g', b', s') are obtained by the gammma correction using expression (1), respectively.

Figure 20:
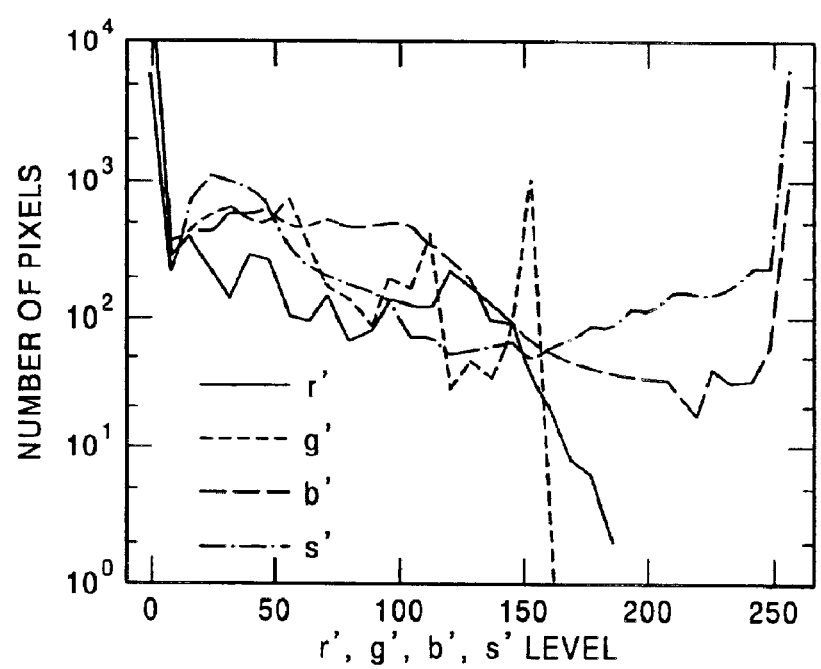
FIG. 20 is a histogram showing gamma-corrected displaying signal levels in the seventh embodiment.

Although actual displaying procedures are not required, the results of the respective converted display signal levels indicated by a histogram are shown in FIG. 20. It can be seen that g' controlling the Y value and r' controlling the X value conspicuously decrease in the range of from 150 to 225 in which the signal level is high by the addition of the s' signal. From the results of FIG. 20, it can be expected that color breakup can be reduced than that when the (r, g, b) signal values of FIG. 18 are field-sequentially displayed as they are.

As described above, according to the field-sequential color display unit in this embodiment, it is possible to reduce color breakup with respect to any inputted image without greatly increasing the sub-filed frequency.

(Eighth Embodiment)

Referring to FIGS. 21 through 24, a field-sequential color display unit according to the eighth embodiment of the present invention will be described below.

Figure 21:
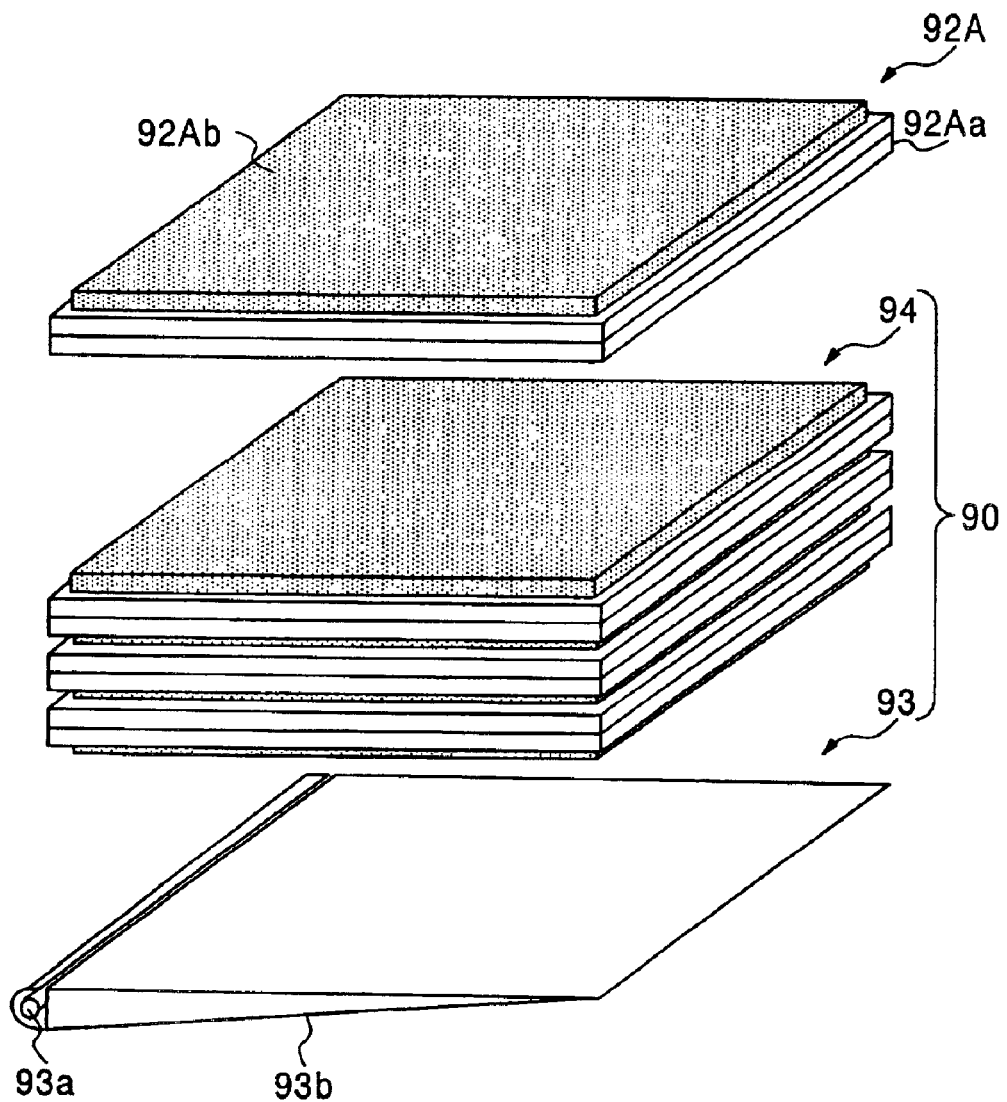
FIG. 21 is an illustration showing a concrete construction of a color displaying part and an image displaying part in the eighth embodiment.

The field-sequential color display unit in this embodiment has a construction shown in FIG. 10 as a basic construction. As shown in FIG. 21, in this field-sequential color display unit, the color displaying part 90 has a backlight part 93 comprising a white light source (e.g., a cold cathode fluorescent lamp) 93a and a light guide plate 93b, and a liquid crystal color shutter 94 capable of RGB color switching, and the image displaying part 92 has a monochrome display LCD 92A comprising a liquid cell 92Aa and a polarizer 92Ab. This field-sequential color display unit is designed to obtain a color image by illuminating the LCD 92A via the liquid crystal color shutter 94 serving as a color filter from the back of the LCD.

This embodiment is characterized in that the color filter can display a plurality of colors other than RGB in addition to the basic three-primary colors. As another embodiment capable of realizing these characteristics, a color filter based on electrochromism is applicable. In addition, as the image displaying part 92, a self-emissive type-CRT or FED (Field Emission Display) or a PDP (Plasma Display Panel) may be used, and a color filter may be arranged in front of a display surface. Moreover, this embodiment can be applied to not only a direct viewing display, but a projection type display or HMD (head mounted display) for projecting an image while enlarging and reducing it by an optical system.

Figure 22:
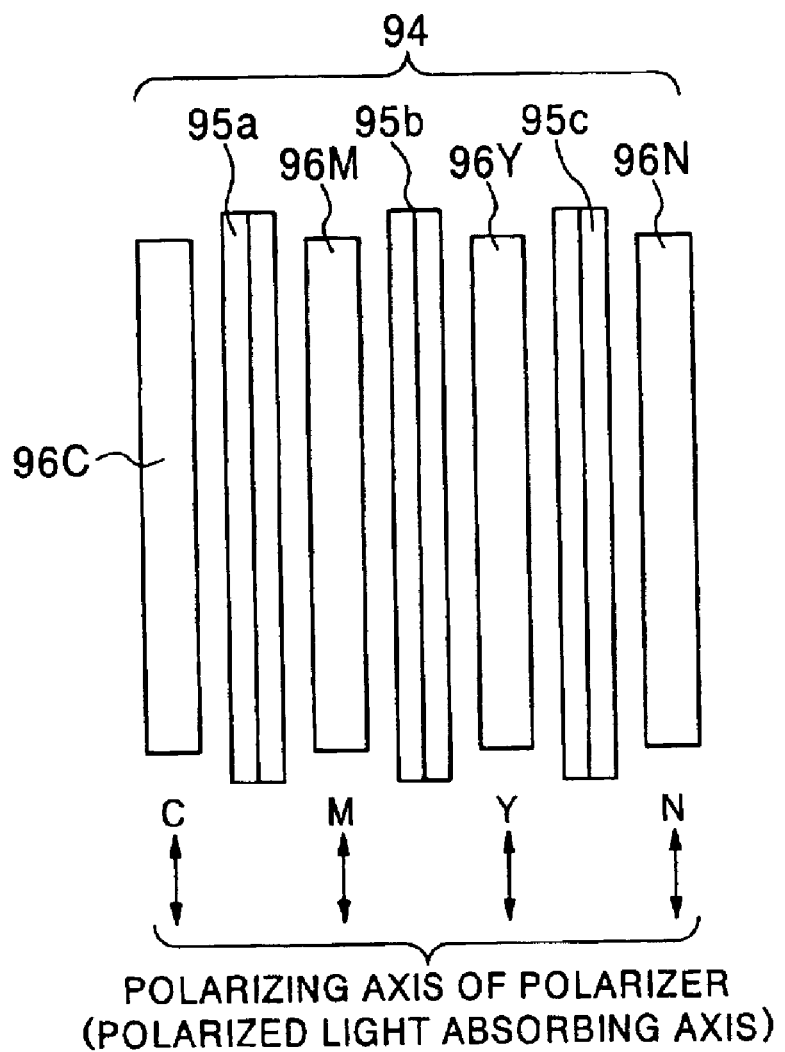
FIG. 22 is an illustration showing the construction of a liquid crystal color shutter in the eighth embodiment.

An example of a construction of the liquid crystal color shutter 94 in this embodiment is shown in FIG. 22. In this embodiment, the liquid crystal color shutter 94 comprises three liquid crystal cells 95a, 95b and 95c, polarizers 96C, 96M, 96Y of CMY colors, and an achromatic color polarizer 96N. The wavelengths of transmitted light absorbed into the color polarizers 96C, 96M, 96Y by the rotation of the polarization axis are selected by the voltage applied to the liquid crystal cells 95a, 95b, 95c, so that the transmitted color is changed. In this embodiment, each of the liquid crystal cells carries out a binary switching, and satisfies 1/2 wavelength conditions to carry out the switching of 0 degree/45 degrees or the 45 degrees/transmission (vanishing of birefringence) of the optical axis of the liquid crystal cell with respect to the polarizing axis of the polarizer to carry out the transmission of incident polarization axis and the rotation thereof by 90 degrees to select the transmission of a specific color components or the transmission of the full wavelength region.

FIG. 23 shows combinations of display colors and transmissive wavelength regions of color polarizers. As shown in FIG. 23, eight colors can display of C, M, Y, W and black in addition to the three-primary colors from the combinations of transmitted colors. For example, red can be displayed by causing the color polarizer 96C, which transmits C color component, to transmit all color components, causing the color polarizer 96M to transmit M color component comprising B and R color component, and causing the color polarizer 96Y to transmit Y color component comprising G and R color component.

Figure 24:
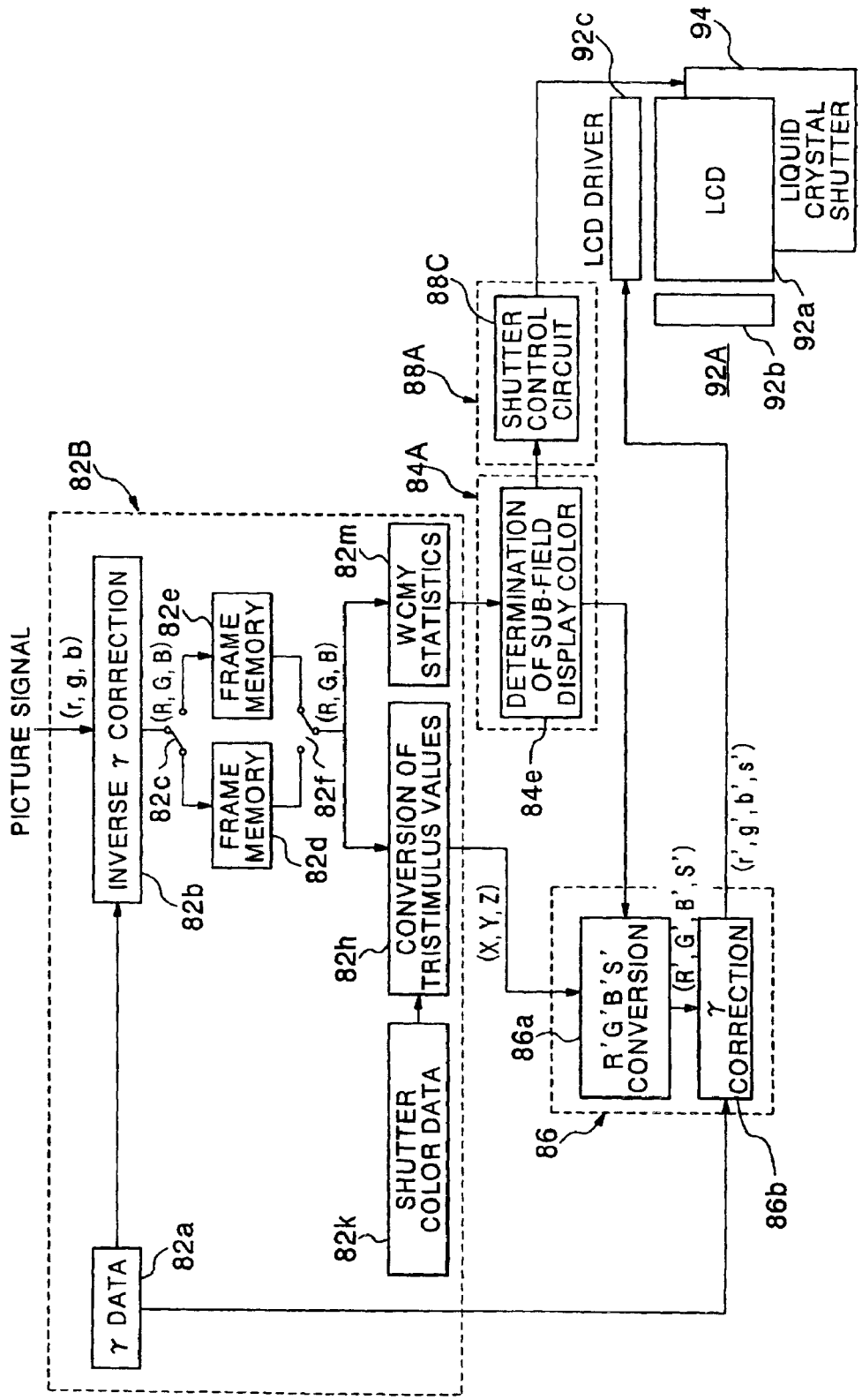
FIG. 24 is a block diagram showing the construction of the eighth embodiment.
Figure 25:
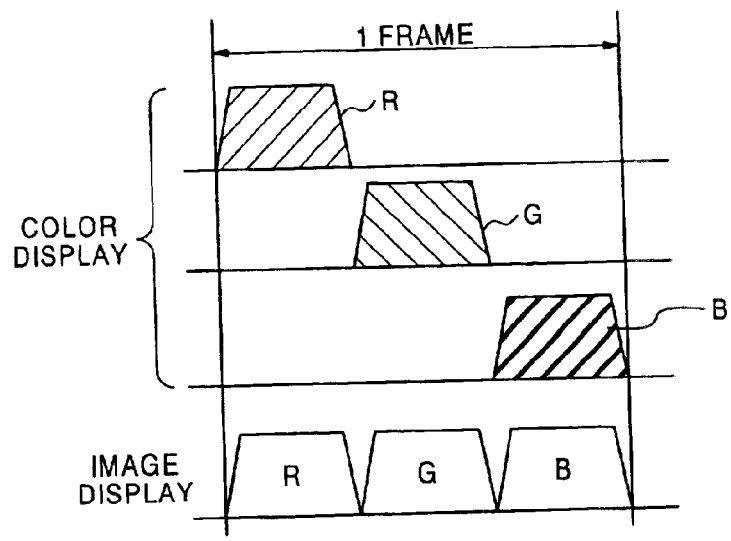
FIG. 25 is a chart showing a basic display sequence in a conventional field-sequential color display unit.
Figure 26:
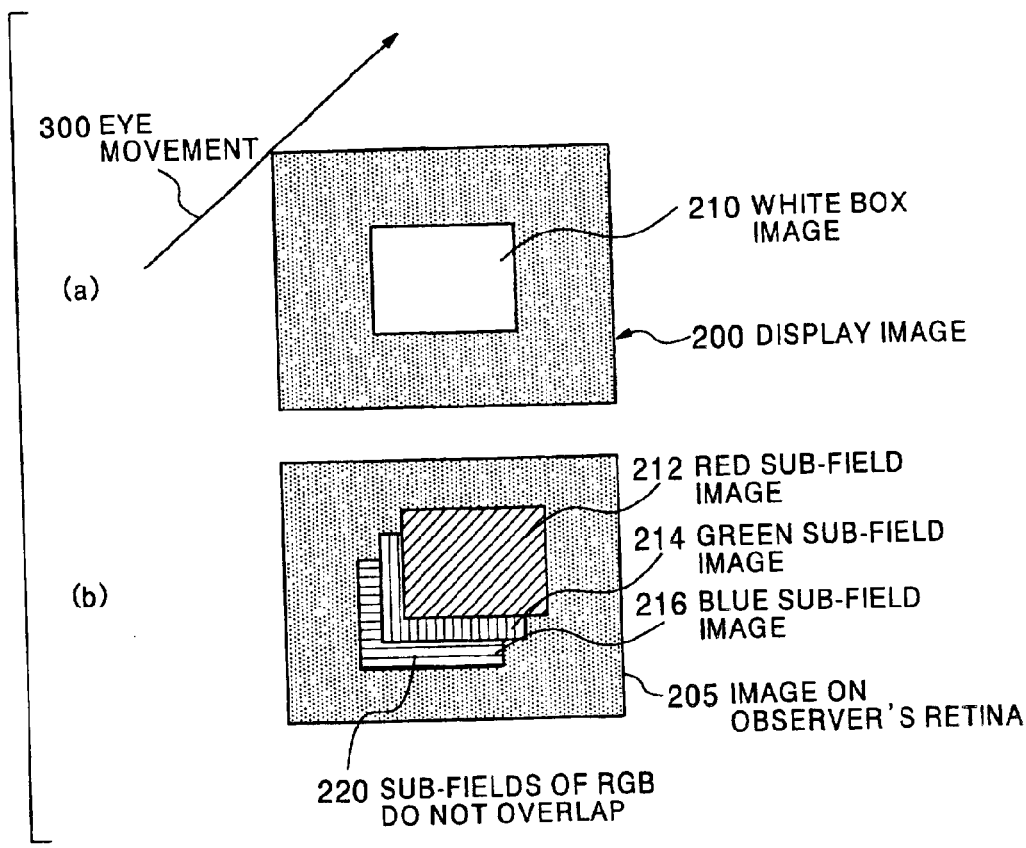
FIG. 26 is an illustration for explaining color breakup in a field-sequential color display.

The construction of the field-sequential color display unit in this embodiment is shown in FIG. 24. The field-sequential color display unit in this embodiment comprises an image evaluator 82B, a sub-field controller 84A, a picture signal converter 86, a color display controller 88A, a monochrome LCD 92A, and the aforementioned liquid crystal color shutter 94. In the image evaluator 82B, the B/L color data storing part 82g and uniform color converter 82i of the image evaluator 82 in the sixth embodiment shown in FIG. 14 are deleted, and a display color data storing part 82k and a WCMY statistical processing part 82m are newly added.

The sub-field controller 84A comprises a sub-field display color determining part 84e. The picture signal converter 86 has the same construction as that of the image evaluator 86 in the sixth embodiment shown in FIG. 14. The color display controller 88A comprises a shutter control circuit 88c for controlling the liquid crystal shutter 94 on the basis of a sub-field display color determined by a sub-field display color determining part 84e.

In this embodiment, the XYZ tristimulus values conversion and the non-linear conversion to uniform color space may be carried out similar to the sixth embodiment. However, since the selection of the color of the additional sub-field should be limited to the selection of one color from four colors of W, C, M and Y, it is more efficient to evaluate image information without converting the (R, G, B) signal system for more simplification. As a method for selecting the color of an additional sub-field,using the frequency of each CMYW, or selecting color, which has the highest average signal level, is applicable in the WCMY statistical processing part 82m.

On the other hand, the method of picture signal conversion (r, g, b)→(r', g', b', s') based on the additional sub-field color may be a simple method which directly uses the difference between the RGB signal and the s' signal. However, it is difficult to obtain a precise display color since the display color of the liquid crystal color shutter is based on the subtractive color mixing system. Therefore, preferably, the conversion to tristimulus values XYZ indicative of color coordinates is carried out in the tristimulus values converter 82h, and thereafter, the matrix conversion of (X, Y, Z)→(R', G', B', S') is carried out in the R'G'B'S' converter 86a.

The concrete converting method has been described in the sixth embodiment. As another method, a compromise system for generating an S' signal from RGB signals and then deriving (R', G', B') by the tristimulus values matrix conversion is applicable as will be described below.

From RGB signals, an S' signal is generated as follows.

$$S = \text{Min}(R, G, B) \tag{22}$$

Then, tristimulus values $X_S$, $Y_S$, and $Z_S$ of an additional sub-field are derived from S', and (R', G', B') are derived by the matrix conversion expression (4) from (X', Y', Z') which are given by the following differential signals from the tristimulus values (X, Y, Z) of the original signal (R, G, B).

$$X' = X - X_S,$$
$$Y' = Y - Y_S,$$
$$Z' = Z - Z_S, \tag{23}$$

The derived (R', G', B', S') are gamma-corrected in the gamma correction part 86b to be converted to signals (r', g', b', s') which are to be applied to the drivers 92b and 92c.

As described above, according to the field-sequential color display unit in this embodiment, it is possible to reduce color breakup with respect to any inputted image without greatly increasing the sub-field frequency, since one color serving as the color of a sub-field to be added is selected from non-three-primary colors of W, C, M and Y in addition to the three-primary colors.

As described above, according to the present invention, it is possible to reduce color breakup with respect to any inputted image without greatly increasing the sub-field frequency.

While the present invention has been disclosed in terms of the embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. A field-sequential color display method comprising:
time-sequentially displaying of luminous information of an input image information with every display color; and
changing the display color in synchronism with the displaying of the luminous information in order to display the input image information,
wherein one frame period in which one color image is displayed comprises at least four sub-field periods in which information of each color is displayed, and a picture signal displayed in at least one sub-field period is a non-three-primary color picture signal which is generated from at least two primary color signals of input picture signals including three-primary color signals, wherein the picture signal displayed in each of the sub-field periods is one of modified picture signals which are obtained by separating the input picture signal into n non-three-primary color picture signals and three modified three-primary color picture signals, where n is an integer of 1 or more, and wherein the separation of the picture signals is carried out by detecting the minimum value of the three-primary color picture signals, causing the minimum value to be set as the signal value of a first non-three-primary color picture signal of the non-three-primary color picture signals, and causing a smaller signal value of two modified picture signals, which are obtained by subtracting the minimum value from the three-primary color picture signal values and which are not zero, to be set as a second non-three-primary color picture signal of the non-three-primary color picture signals.

2. A field-sequential color display method comprising:

time-sequentially displaying of luminous information of an input image information with every display color; and changing the display color in synchronism with the displaying of the luminous information in order to display the input image information, wherein one frame period in which one color image is displayed comprises at least four sub-field periods in which information of each color is displayed, and a picture signal displayed in at least one sub-field period is a non-three-primary color picture signal comprising a color determined on the basis of the color picture signals is of the input image information in one frame period, the color not being fixed to one color, wherein the picture signals displayed in each of the sub-field periods is one of modified picture signals which are obtained by separating the input picture signal into the n non-three-primary color picture signals and three modified three-primary color picture signals when n is an integer of 1 or more, and wherein the input picture signal is separated into two non-primary color picture signals and three modified three-primary color picture signals, the method further comprising:

detecting a minimum value of three-primary color picture signals of the input image information for every pixel;

setting the minimum value as the signal value of a first non-three-primary color picture signal for every pixel;

subtracting the minimum value from each signal value of the three-primary color picture signals for every pixel;

setting remainders of the subtraction as signal values of first modified three-primary color picture signals for every pixel;

detecting combinations, in which values of two of the first modified three-primary color picture signals are not zero, out of combinations of the first modified three-primary color picture signals for every pixel;

detecting the number of each detected combination of the first modified three-primary color picture signals in one frame;

selecting a kind of combination of the largest number of the detected combinations;

detecting a minimum value of the two of the first modified three-primary color picture signals of the selected combination for every pixel;

setting the minimum value for the selected combination and zero for the non-selected three-primary color picture signal as a signal value of a second non-three-primary color picture signal for every pixel;

subtracting the signal value of the second non-three-primary picture signal from each signal value of the first modified three-primary color picture signals for every pixel; and setting a remainder of the subtraction as a signal value of second modified three-primary color picture signals for every pixel, wherein the picture signal displaying during each sub-field period is one of the first non-three-primary color picture signal, the second non-three-primary color picture signal, and the second modified three-primary color picture signal for every pixel.

3. A field-sequential color display method comprising:

time-sequentially displaying of luminous information of an input image information with every display color; and changing the display color in synchronism with the displaying of the luminous information in order to display the input image information, wherein one frame period in which one color image is displayed comprises at least four sub-field periods in which information of each color is displayed, and a picture signal displayed in at least one sub-field period is a non-three-primary color picture signal comprising a color determined on the basis of the color picture signals of the input image information in one frame period, the color not being fixed to one color, wherein the picture signal displayed in each of the sub-field periods is one of modified picture signals which are obtained by separating the input picture signal into the n non-three-primary color picture signals and three modified three-primary color picture signals when n is an integer of 1 or more, and wherein the input picture signal is separated into three non-primary color picture signals and three modified three-primary color picture signals, the method further comprising:

detecting a minimum value of three-primary color picture signals of the input image information for every pixel;

setting the minimum value as the signal value of a first non-three-primary color picture signal for every pixel;

subtracting the minimum value from each signal value of the three-primary color picture signals for every pixel;

setting remainders of the subtraction as signal values of first modified three-primary color picture signals for every pixel;

detecting combinations, in which values of two of the first modified three-primary color picture signals are not zero, out of combinations of the first modified three-primary color picture signals for every pixel;

detecting the number of each detected combination of the first modified three-primary color picture signals in one frame;

selecting a first combination of the largest number of the detected combinations;

detecting a minimum value of the two of the first modified three-primary color picture signals of the selected first combination for every pixel;

setting the minimum value for the selected first combination and zero for the non-selected three-primary color picture signal as a signal value of a second non-three-primary color picture signal for every pixel;

subtracting the signal value of the second non-three-primary picture signal from each signal value of the first modified three-primary color picture signals for every pixel;

setting a remainder of the subtraction as a signal value of second modified three-primary color picture signals for every pixel, detecting combinations, in which values of two of the second modified three-primary color picture signals are not zero, out of combinations of the second modified three-primary color picture signals for every pixel;

detecting the number of each detected combination of the second modified three-primary color picture signals in one frame;

selecting a second combination of the largest number of the detected combinations;

detecting a minimum value of the two of the second modified three-primary color picture signals of the selected second combination for every pixel;

setting the minimum value for the selected second combination and zero for the non-selected three-primary picture signal as a third non-three-primary color picture signal for every pixel;

subtracting the signal value of the third non-three-primary picture signal from each signal value of the second modified three-primary color picture signals for every pixel; and setting a remainder of the subtraction as a signal value of third modified three-primary color picture signals for every pixel, wherein the picture signal displaying during each sub-field period is one of the first to third non-three-primary color picture signals and the third modified three-primary color picture signals.

4. A field-sequential color display method comprising:

time-sequentially displaying of luminous information of an input image information with every display color; and changing the display color in synchronism with the displaying of the luminous information in order to display the input image information, wherein one frame period in which one color image is displayed comprises at least four sub-field periods in which information of each color is displayed, and a picture signal displayed in at least one sub-field period is a non-three-primary color picture signal comprising a color determined on the basis of the color picture signals of the input image information in one frame period, the color not being fixed to one color, wherein the picture signal displayed in each of the sub-field periods is one of modified picture signals which are obtained by separating the input picture signal into the n non-three-primary color picture signals and three modified three-primary color picture signals when n is an integer of 1 or more, and wherein the input picture signal is separated into two non-primary color picture signals and four modified three-primary color picture signals, the method further comprising:

detecting a minimum value of three-primary color picture signals of the input image information for every pixel;

setting the minimum value as the signal value of a first non-three-primary color picture signal for every pixel;

subtracting the minimum value from each signal value of the three-primary color picture signals for every pixel;

setting remainders of the subtraction as signal values of first modified three-primary color picture signals for every pixel;

detecting combinations, in which values of two of the first modified three-primary color picture signals are not zero, out of combinations of the first modified three-primary color picture signals for every pixel;

detecting the number of each detected combination of the first modified three-primary color picture signals in one frame;

selecting a first combination of the largest number of the detected combinations;

detecting a minimum value of the two of the first modified three-primary color picture signals of the selected first combination for every pixel;

setting the minimum value for the selected first combination and zero for the non-selected three-primary color picture signal as a signal value of a second non-three-primary color picture signal for every pixel;

subtracting the signal value of the second non-three-primary picture signal from each signal value of the first modified three-primary color picture signals for every pixel;

setting a remainder of the subtraction as a signal value of second modified three-primary color picture signals for every pixel, detecting combinations, in which values of two of the second modified three-primary color picture signals are not zero, out of combinations of the second modified three-primary color picture signals for every pixel;

detecting the number of each detected combination of the second modified three-primary color picture signals in one frame;

selecting a second combination of the largest number of the detected combinations;

detecting a minimum value of the two of the second modified three-primary color picture signals of the selected second combination for every pixel;

setting the minimum value for the selected second combination and zero for the non-selected three-primary color picture signal as a third non-three-primary color picture signal for every pixel;

subtracting the signal value of the third non-three-primary picture signal from each signal value of the second modified three-primary color picture signals for every pixel;

setting a remainder of the subtraction as a signal value of third modified three-primary color picture signals for every pixel, detecting combinations, in which values of two of the third modified three-primary color picture signals are not zero, out of combinations of the third modified three-primary color picture signals for every pixel;

detecting the number of each detected combination of the third modified three-primary color picture signals in one frame;

selecting a third combination of the largest number of the detected combinations;

detecting a minimum value of the two of the third modified three-primary color picture signals of the selected third combination for every pixel;

setting the minimum value for the selected third combination and zero for the non-selected three-primary color picture signal as a fourth non-three-primary color picture signal for every pixel;

subtracting the signal value of the fourth non-three-primary picture signal from each signal value of the third modified three-primary color picture signals for every pixel; and setting a remainder of the subtraction as a signal value of fourth modified three-primary color picture signals for every pixel, wherein the picture signal displaying during each sub-field period is one of the first to fourth non-three-primary color picture signals and the fourth modified three-primary color picture signals.

* * * * *